United States Patent

Ohwe et al.

[11] Patent Number: 6,002,548
[45] Date of Patent: Dec. 14, 1999

[54] MAGNETIC HEAD SUPPORTING MECHANISM

[75] Inventors: Takeshi Ohwe; Yoshifumi Mizoshita, both of Kawasaki, Japan

[73] Assignee: Fujitsu Limited, Kawasaki, Japan

[21] Appl. No.: 08/475,181

[22] Filed: Jun. 7, 1995

Related U.S. Application Data

[62] Division of application No. 08/110,771, Aug. 23, 1993, abandoned.

[30] Foreign Application Priority Data

Nov. 27, 1992 [JP] Japan ................................... 4-318846
Apr. 8, 1993 [JP] Japan ................................... 5-082110

[51] Int. Cl.$^6$ ..................................................... G11B 5/48
[52] U.S. Cl. ............................................................. 360/104
[58] Field of Search ................................... 360/104, 105, 360/106

[56] References Cited

U.S. PATENT DOCUMENTS

| | | |
|---|---|---|
| 4,853,813 | 8/1989 | Yamanouchi . |
| 5,006,946 | 4/1991 | Matsuzaki . |
| 5,065,271 | 11/1991 | Matsuura et al. . |
| 5,198,945 | 3/1993 | Blaeser et al. . |
| 5,305,168 | 4/1994 | Lin et al. . |
| 5,331,489 | 7/1994 | Johnson et al. ........................... 360/104 |
| 5,414,576 | 5/1995 | Ueki et al. ................................ 360/104 |
| 5,422,764 | 6/1995 | McIlvanie ................................. 360/106 |

FOREIGN PATENT DOCUMENTS

| | | |
|---|---|---|
| 0 267 749 A3 | 5/1988 | European Pat. Off. . |
| 0 342 625 A3 | 11/1989 | European Pat. Off. . |
| 0 397 896 | 11/1990 | European Pat. Off. . |
| 0484906 | 5/1992 | European Pat. Off. ............... 360/104 |
| 0 487 914 A2 | 6/1992 | European Pat. Off. . |
| 487 914 | 6/1992 | European Pat. Off. . |
| 53-30310 | 3/1978 | Japan . |
| 59-60761 | 4/1984 | Japan ................................... 360/104 |
| 60-246015 | 12/1985 | Japan . |
| 63-83908 | 4/1988 | Japan . |
| 1-128277 | 5/1989 | Japan . |
| 2-227813 | 9/1990 | Japan . |
| 3-189976 | 8/1991 | Japan . |
| 4162271 | 6/1992 | Japan . |
| 5166159 | 7/1993 | Japan ................................... 360/104 |
| 6124558 | 5/1994 | Japan ................................... 360/104 |
| 92/20066 | 11/1992 | WIPO . |

OTHER PUBLICATIONS

IBM Technical Disclosure Bulletin (vol. 24, No. 10, Mar. 1982).
Patent Abstracts of Japan, vol. 10, No. 116 (P–452) Apr. 30, 1986 of JP–A–60 246015 (Nippon Denshin Denwa Kosha) Dec. 5, 1985.
Patent Abstracts of Japan, vol. 10, No. 284 (P–501) Sep. 26, 1986 JP–A–61 104315 (Fujitsu Ltd.) May 22, 1986.
Patent Abstracts of Japan, vol. 2, No. 109 (E–056) Sep. 9, 1978 of JP–A–53 074414 (Matsushita Electric Ind. Co. Ltd.) Jul. 1, 1978.
Patent Abstracts of Japan, vol. 2, No. 064 (E–033) May 17, 1978 of JP–A–53 030310 (Fujitsu Ltd.) Mar. 22, 1978.
Patent Abstracts of Japan, vol. 3, No. 077 (E–120) Jun. 30, 1979 of JP–A–54 054614 (NEC Corp.) May 1, 1979.

(List continued on next page.)

*Primary Examiner*—Allen T. Cao
*Attorney, Agent, or Firm*—Armstrong, Westerman, Hattori, McLeland & Naughton

[57] ABSTRACT

A magnetic head supporting mechanism includes a head positioning actuator having an arm, and a load beam connected to the arm. The load beam has a gimbal. The gimbal includes a magnetic head slider fixing portion on which a magnetic head slider having a magnetic head is mounted, a first pair of beams extending from opposite sides of the magnetic head slider fixing portion along a traverse direction of the load beam perpendicular to a longitudinal direction thereof, and a second pair of beams respectively connected to the first pair of beams and extending so as to face the opposite sides of the magnetic head slider fixing portion.

52 Claims, 19 Drawing Sheets

OTHER PUBLICATIONS

Patent Abstracts of Japan, vol. 14, No. 160 (P–1028) Mar. 28, 1990 of JP–A–02 015412 (Matsushita Electric Ind. Co. Ltd.) Jan. 19, 1990.

Patent Abstracts of Japan, vol. 14, No. 191 (P–1038) Apr. 18, 1990 of JP–A–02 035676 (NEC Corp.) Feb. 6, 1990.

Patent Abstracts of Japan, vol. 15, No. 483 (P–1285) Dec. 6, 1991 of JP–A–03 209610 (Matsushita Electric Ind. Co. Ltd.) Sep. 12, 1991.

Hutchinson Technology, Type 16 Suspension Product Summary, Jul. 15, 1991.

Patent Abstracts of Japan, vol. 14, No. 160, Mar. 28, 1990.

Patent Abstracts of Japan, vol. 8, No. 192, Sep. 4, 1984.

Patent Abstracts of Japan, vol. 10, No. 116, Apr. 30, 1986.

Patent Abstracts of Japan, vol. 14, No. 191, Apr. 18, 1990.

Patent Abstracts of Japan, vol. 13, No. 152, Apr. 13, 1989.

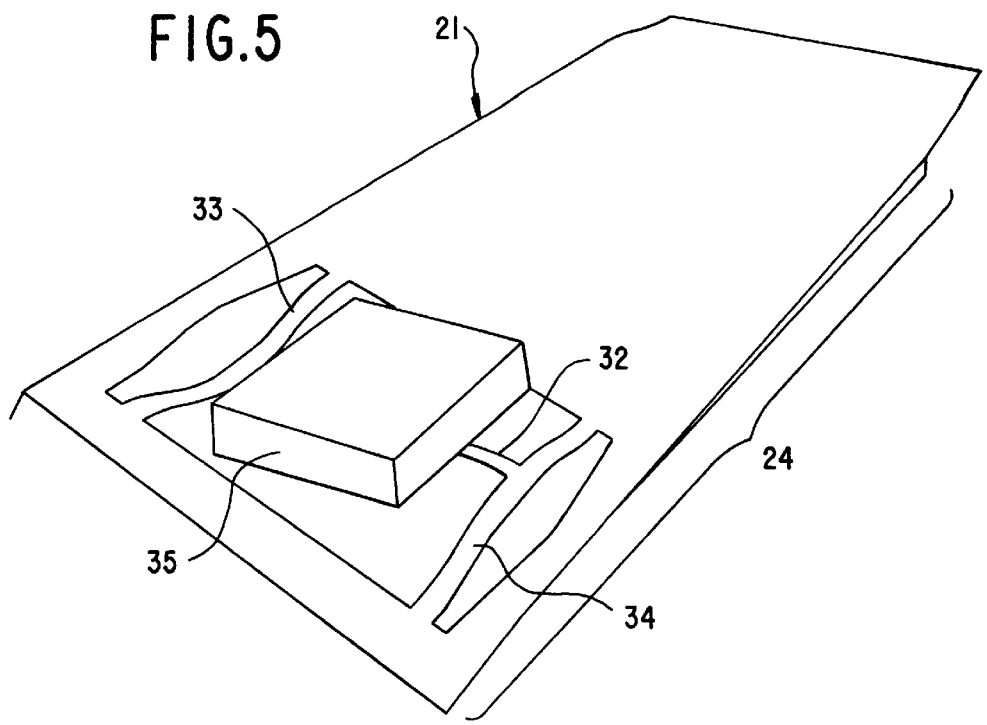
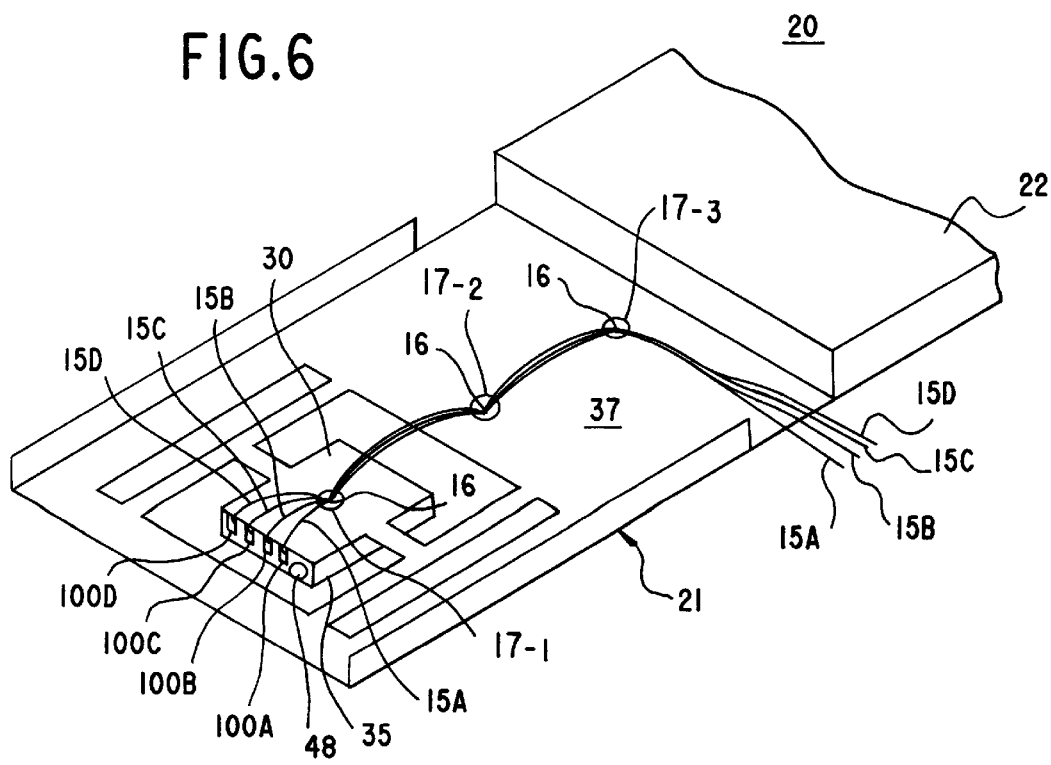

MAGNETIC HEAD SUPPORTING MECHANISM

This is a division of application Ser. No. 08/110,771 filed Aug. 23, 1993, now abandoned.

BACKGROUND OF THE INVENTION

1. Field of the Invention

The present invention relates to a magnetic head supporting mechanism used for a magnetic disk drive.

2. Description of the Related Art

A magnetic head slider on which a magnetic head is mounted is attached to a free end of a load beam, and is maintained, during a recording/reproducing operation, in a state in which the magnetic head slider flies above a magnetic disk.

Recently, it has been required to improve an HDI (Head Disk Interface) characteristic, which is one of the parameters describing the reliability of magnetic disk drives. In order to meet the above requirement, it is nessary to diminish the mass of the magnetic head slider or reduce a spring force urging the magnetic head slider towards the magnetic disk.

The following event will occur when the mass of the magnetic head slider is diminished. It is necessary to reduce the size of a supporting spring which holds the magnetic head slider as the slider is reduced in size. This is intended to maintain the following characteristic with respect to waviness of the disk and maintain the flying stability of the head. The following event will occur when the spring force on the head slider is reduced. That is, the flying stiffness of the head is degraded due to reduction of the spring force on the head slider. Further, the possibility of assembly errors increases because parts, such as a slider and a supporting spring, are diminished in mass. With the above in mind, it is necessary for a device for supporting a magnetic head slider to have a mechanism capable of sufficiently ensuring the flying stability of the magnetic head slider.

Conventionally, the magnetic head supporting mechanism is made up of a load beam, a gimbal fixed to the load beam, and a magnetic head slider fixed to the gimbal. With the above structure, it is more difficult to assemble (position) these parts as the size of the parts is reduced. When there is an assembly error, the magnetic head slider is maintained in an unbalance flying state in which the slider flies in a tilted state. Hence, the reliability of the flying head is degraded and further the read/write characteristics are also degraded. As a result, the reliability of the magnetic disk drive is also degraded.

In order to eliminate the factors causing the unbalanced flying due to the assembly error of the head supporting mechanism, Japanese Patent Laid-Open Application No. 3-189976 proposes an improvement in which an integrally formed supporting spring corresponding to the conventional load beam and gimbal is used and assembly is no longer needed.

FIG. 1 shows a magnetic head supporting mechanism 1 disclosed in the above application document. The magnetic head supporting mechanism 1 includes a load arm 3 and a load beam 4 (which is also referred to as a flexure). The load beam 4 includes a gimbal 5, which has openings (through holes) 6 and 7 having a substantially C shape. Further, the gimbal 5 includes a beam 8 supported at both ends in a direction in which the beam 8 traverses the load beam 4, and tongue portions 9 and 10 extending from the beam 8. The back surface of the magnetic head slider 11 is formed so that grooves are formed in the width direction of the load beam 4.

The magnetic head slider 11 can be rotated together with a twist of the beam 8 in a pitching direction indicated by an arrow 12, and can be rotated together with a bend of the beam 8 in a rolling direction indicated by an arrow 13.

It is necessary to reduce the rotation stiffness of the gimbal 5 in order to ensure the flying stability of the compact magnetic head slider. Further, it is impossible to reduce the thickness t of the gimbal 5 having the above structure because the load beam 4 needs to be stiff. In order to reduce the rotation stiffness of the gimbal 5 without reducing the thickness t of the load beam 4, it is necessary to lengthen the length l of the beam 8. If the load beam 4 and the gimbal 5 are made to have different thicknesses, it is necessary to a complex process in which only the gimbal 5 is half etched, while the load beam is not processed. However, it is very difficult to obtain a desired precision in thickness by the above process and to obtain desirable characteristics.

If the length l of the beam 8 is increased, the following disadvantages will occur. First, the resonance point (frequency) of vibration of the twist and bend of the beam 8 will greatly becomes lower, and it becomes likely that the degree of flying of the magnetic head slider 11 is varied. Second, the width W of the load beam 4 increases, and hence the resonance frequency of vibration of the load beam 4 itself will becomes lower. Thus, the flying magnetic head slider 11 becomes unstable.

Consequently, when the integrally formed supporting spring having the integrated load beam and gimbal is used, it is very difficult to realize a structure of the integrated supporting spring in which only the rotation stiffness is reduced without decreasing the resonance frequency of the gimbal.

It becomes impossible to neglect the influence of lead wires connected to the head because of degradation of the airbearing stiffness caused by down-sizing of the slider and reduction in the load force on the head slider. More particularly, the slider is affected by the stiffness of the lead wires and may cause the slider to fly in the tilt state. Particularly, when a magneto-resistive effect type head (MR head) is used as a reproduction head, such a head is combined with an interactive type head. Hence, four lead wires equal to twice the number of lead wires for the conventional recording/reproducing head are needed. Use of the four lead wires increases the influence of the stiffness of the lead wires. This degrades not only the reliability of the flying head but also the read/write characteristics. Hence, the magnetic disk drive does not have satisfactory reliability.

SUMMARY OF THE INVENTION

It is a general object of the present invention to provide a magnetic head supporting mechanism in which the above disadvantages are eliminated.

A more specific object of the present invention is to provide a magnetic head supporting mechanism capable of stably maintaining a magnetic head slider in the flying state.

The above objects of the present invention are achieved by a magnetic head supporting mechanism comprising: a head positioning actuator (223) having an arm (22); and a load beam (21) connected to said arm. The load beam has a gimbal (25) comprising: a magnetic head slider fixing portion (30) on which a magnetic head slider (35) having a magnetic head is mounted; a first pair of beams (31, 32) extending from opposite sides of the magnetic head slider fixing portion along a traverse direction (38) of the load beam perpendicular to a longitudinal direction (37) thereof; and a second pair of beams (33, 34) respectively connected to the first pair of beams and extending along said opposite sides of the magnetic head slider fixing portion.

In an alternative, the first pair of beams extends in the longitudinal direction, and the second pair of beams extends in the traverse direction.

The above objects of the present invention are also achieved by a magnetic head supporting mechanism comprising: a head positioning actuator (223) having an arm (22); and a load beam (21) connected to said arm. The load beam having a gimbal (51) comprises: a magnetic head slider fixing portion (30) on which a magnetic head slider (35) having a magnetic head is mounted; a first pair of beams (31, 32) extending from opposite sides of the magnetic head slider fixing portion along a longitudinal direction of the load beam perpendicular to a traverse direction thereof; and a second pair of beams (33, 34) respectively connected to the first pair of beams and extending along said opposite sides of the magnetic head slider fixing portion.

Another object of the present invention is to provide a magnetic disk drive having the above-mentioned magnetic head supporting mechanism.

BRIEF DESCRIPTION OF THE DRAWINGS

Other objects, features and advantages of the present invention will become more apparent from the following detailed description when read in conjunction with the accompanying drawings, in which:

FIG. 5 is a perspective view of a first-order twist state of the load beam shown in FIG. 2;

FIG. 6 is a perspective view of the upper side of the magnetic head supporting mechanism shown in FIG. 2;

DESCRIPTION OF THE PREFERRED EMBODIMENTS

A description will now be given, with reference to FIG. 2, of a magnetic head supporting mechanism 20 according to a first embodiment of the present invention.

Figure 3:
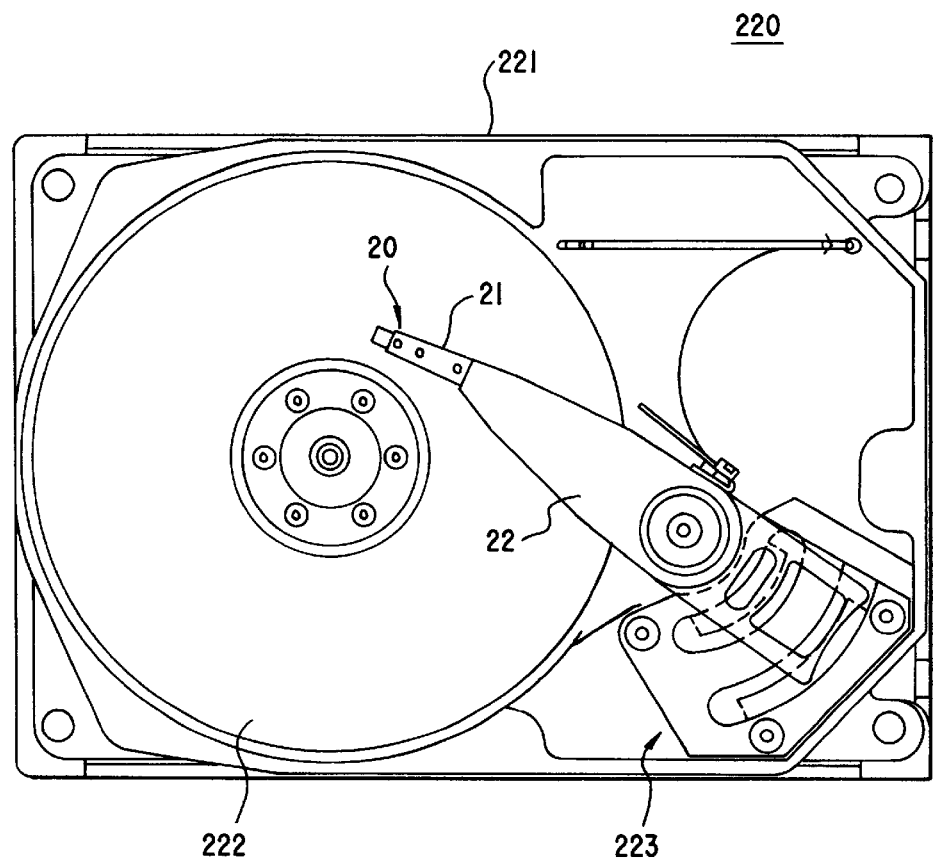
FIG. 3 is a plan view of a 3.5-inch magnetic disk drive to which the magnetic head supporting mechanism shown in FIG. 2 is applied.

FIG. 3 shows a 3.5-inch type magnetic disk drive 220 to which the magnetic head supporting mechanism 20 is applied. The magnetic disk drive 220 has an enclosure 221 in which a 3.5-inch magnetic disk 222, a head positioning actuator 223 and other parts are housed.

A load beam 21 made of stainless steel is fixed to an arm 22 of the actuator 223. The load beam 21 has a curved bent portion 23 generating elasticity. In this regard, the curved portion 23 of the load beam 21 is also referred to as an elastic portion 23 in the following description. The load beam 21 has a stiffness portion 24 extending from the elastic portion 23, and ribs 21a. The elastic portion 23 provides a magnetic head slider 35 with a load in a direction in which the magnetic head slider 35 moves and comes into contact with a magnetic disk 222. The load beam 21 has a uniform thickness of, for example, approximately 25 µm, which is equal to one-third of the thickness of a load beam of a 3380-type (IBM) head supporting mechanism.

It is desirable that the width W1 of the load beam 21 is made as small as possible, desirably 4 mm or less. This is because the resonance frequency of vibration of the load beam 21 is prevented from lowering.

A gimbal 25 is formed in the load beam 21. The gimbal 25 includes a pair of C-shaped openings 26 and 26 facing each other in the longitudinal direction of the load beam 21. Two slits 28 and 29 are formed in the load beam 21 along respective sides of the load beam 21.

The gimbal 25 includes a magnetic slider fixing portion 30, a first pair of beam portions 31 and 32, and a second pair of beam portions 33 and 34. The magnetic head slider fixing portion 30 has large surface dimensions enough to fix the magnetic head slider 35 thereon, and has the same dimensions as the magnetic head slider 35 (a=1.6 mm, b=2.0 mm). However, it is possible for the slider fixing portion 30 to have an area less than the magnetic head slider 35 when a sufficient adhesive strength can be obtained.

The magnetic head slider 35 is a light weight structure type slider, which has been proposed in Japanese Patent Laid-Open Application No. 4-228157. The proposed slider has a flat back surface opposite to a disk facing surface. The flat back surface of the slider is fixed to the fixing portion 30 by means of an adhesive. In this case, the slider 35 is located so that the center thereof corresponds to the center of the fixing portion 30. It is also possible to use other types of sliders.

The beam portions 31 and 32 extend outwardly from the respective sides of the fixing portion 30 along a line (load beam width direction line) 38, which passes through the center of the fixing portion 30 (the above center is also the center of the slider 35), and crosses a longitudinal center line 37 of the load beam 21 at a right angle. Each of the beam portions 31 and 32 has a length $l_1$.

The beam portion 33 extends from the beam portion 31 towards the respective sides of the beam portion 31 so that the beam portion 33 crosses the beam portion 31 at a right angle and extends in parallel with the line 37. Similarly, the beam portion 34 extends from the beam portion 32 towards the respective sides of the beam portion 32 so that the beam portion 34 crosses the beam portion 32 at a right angle and extends parallel to the line 37. The beam portion 33 is joined to portions 40 and 41 of the load beam 21 in the periphery of the gimbal 25. Similarly, the beam portion 34 is joined to portions 42 and 43 of the load beam 21 in the periphery of the gimbal 25. In other words, the beam portion 33 extends from the portions 40 and 41 of the gimbal 25, and the beam portion 34 extends from the portions 42 and 43 of the gimbal 25. The distance between the center of the beam portion 33 and one of the two ends thereof is $l_2$. Similarly, the distance between the center of the beam portion 34 and one of the two ends thereof is also $l_2$.

The beam portion 33 and the beam portion 31 form a T-shaped beam 39A. Similarly, the beam portion 34 and the beam portion 32 form a T-shaped beam 39B. The beam portions 31, 32, 33 and 34 form an H-shaped beam. It will be noted that the fixing portion 30, the first pair of beams 31 and 32, and the second pair of beams 33 and 34 are portions of the load beam 21.

The length $l_1$ of the first pair of beams 31 and 32 is limited by the width W1 of the load beam 21. As the width W1 of the load beam 21 is increased, the resonance frequency of a bend and twist of the load beam 21 becomes lower, and the flying characteristics of the slider 35 are degraded. For these reasons, the width W1 cannot be increased. However, according to the first embodiment of the present invention, it is possible to increase the length $l_2$ of the second pair of beams 33 and 34 without being limited by the width W1 of the load beam 21. The second pair of beams 33 and 34 is formed so that $l_2 > l_1$. That is, each of the T-shaped beams 39A and 39B has a leg portion and an arm portion longer than the leg portion.

When a waviness of the magnetic disk being rotated is present or dust adheres to the magnetic disk, the magnetic head slider 35 is rotated in a pitching direction indicated by an arrow 44 in a state in which the first pair of beams 31 and 32 and the second pair of beams 33 and 34 are bent. At this time, a twist deformation occurs in the first pair of beams 31 and 32 of the gimbal 25, and a bend deformation occurs in the second pair of beams 33 and 34.

As indicated by an arrow 45, the magnetic head slider 35 is rotated in a rolling direction also. At this time, bend deformations occur in the beams 31 and 32 in the respective directions opposite to each other, and bend deformations occur in the beams 33 and 34 in the respective directions opposite to each other.

Figure 4:
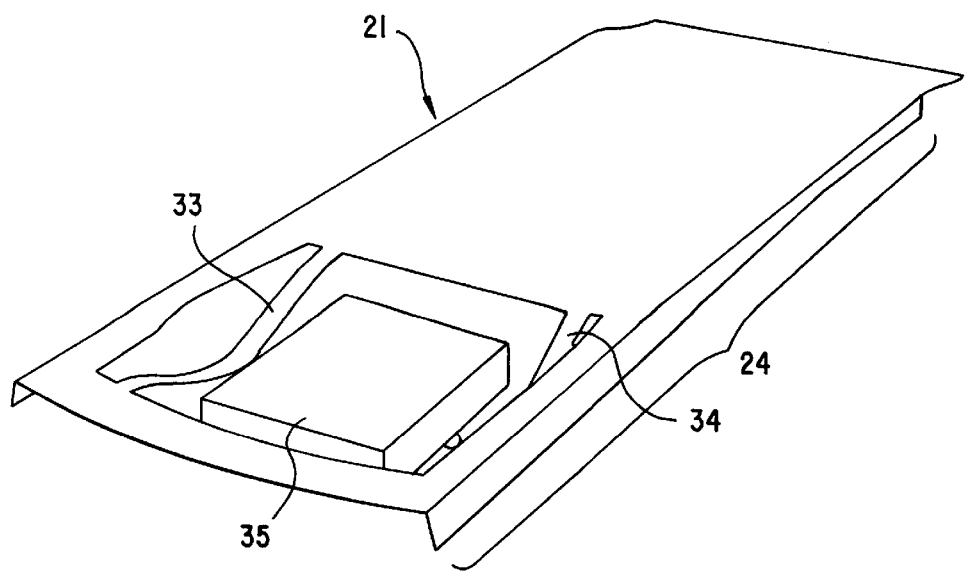
FIG. 4 is a perspective view of a first-order bend state of a load beam shown in FIG. 2.

FIG. 4 shows a resonance mode of the first-order bend. A deformation occurs in the elastic portion 23 formed at the root of the load beam 21, and the first pair of beams 31 and 32 and the second pair of beams 33 and 34 are deformed in the same direction.

FIG. 5 shows a resonance mode of the first-order twist. A twist deformation occurs in the elastic portion 23 formed at the root of the load beam 21 in such a manner so the right and left portions of the elastic portion 23 have different heights. The beam located on the right side of the gimbal 25 is deformed so as to be formed into a convex shape facing upwards. The beam located on the left side of the gimbal 25 is deformed so as to be shaped into a convex facing downwards. When the lengths $l_1$ and $l_2$ are selected so that the length $l_2$ is equal to three or four times the length $l_1$, the rotation stiffness responses of the slider in the pitching and rolling directions become sufficiently soft and are almost the same as each other.

Figure 1:
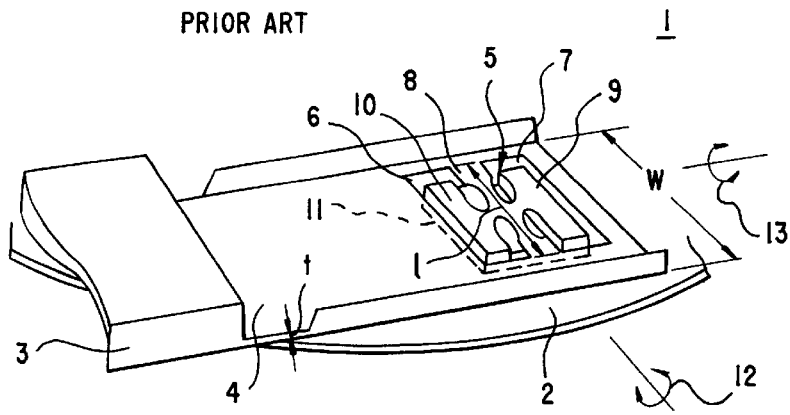
FIG. 1 is a perspective view of a conventional magnetic head supporting mechanism.
Figure 2:
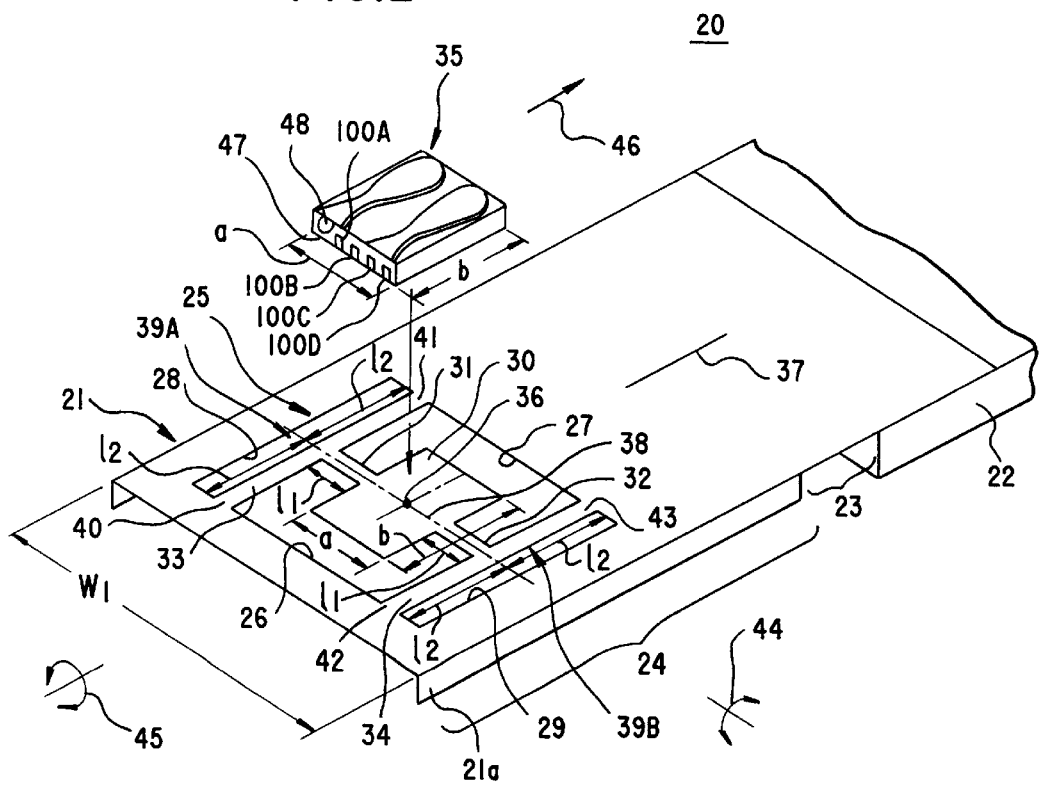
FIG. 2 is a perspective view of a magnetic head supporting mechanism according to a first embodiment of the present invention.

As shown in FIG. 2, a composite type magnetic head 48 and four terminals 100A, 100B, 100C and 100D are provided in the magnetic head slider 35. The magnetic head 48 includes an MR head for reproduction and an interactive type head for recording, these heads being integrated with each other. The magnetic head 48 is located at a rear end surface of the magnetic head slider 35 in a relative movement direction 46 with respect to the magnetic disk 222.

Figure 7:
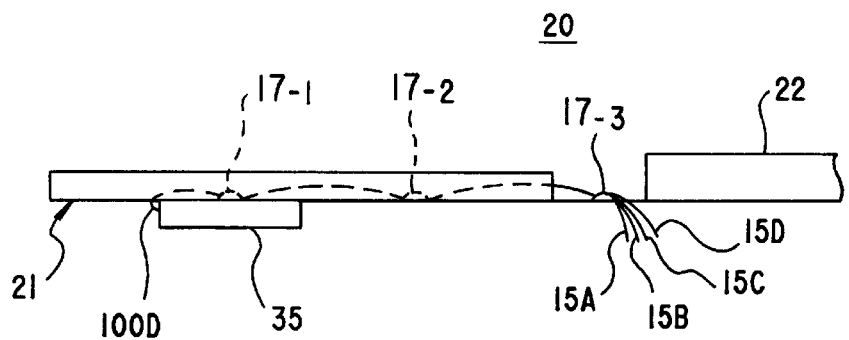
FIG. 7 is a side view of the magnetic head supporting mechanism shown in FIG. 2.

As shown in FIGS. 6 and 7, lead wires 15A, 15B, 15C and 15D are connected to the terminals 100A, 100B, 100C and 100D, respectively. Each of the lead wires 15A through 15D has a diameter of, for example, 30 µm. The lead wires 15A–15D are laid on the side opposite to the side on which the magnetic head slider 35 is mounted, and are attached to a center portion 36 of the fixing portion 30 by means of an adhesive 16. Further, the lead wires 15A–15D extend along the longitudinal center line 37 of the load beam 21 towards the base portion of the load beam 21, and are fixed thereto at two points by means of the adhesive 16.

Reference numbers $17_{-1}$, $17_{-2}$ and $17_{-3}$ respectively indicate a first fixing point, a second fixing point and a third fixing point at which the lead wires 15A through 15D are fixed by means of the adhesive 16. The first fixing point $17_{-1}$ moves in accordance with movement of the magnetic head slider 35. Hence, it is unnecessary to be concerned about the stiffness of portions of lead wires 15A through 15D between the terminals 100A–100D and the first fixing point $17_{-1}$ and to provide additional lengths of the lead wires 15A–15D. In FIG. 6, such additional lengths of the lead wires 15A–15D are not provided. The distance between the first fixing point $17_{-1}$ and the second fixing point $17_{-2}$ is long, and the stiffness of the lead wires 15A-15B between the fixing points $17_{-1}$ and $17_{-2}$ little affects the rotation stiffness of the gimbal 25.

The magnetic head supporting mechanism 20 has the following features. First, the rotation stiffness of the gimbal 25 is considerably small because of the characteristics of the T-shaped beams. Second, the gimbal 25 is supported at the four points 40–43, and hence, the resonance frequency of vibration of the gimbal 25 is high even when the second pair of beams 33 and 34 is long. Third, the end of the load beam 21 can be formed so that it has a small width W1, and hence the resonance frequency of vibration of the load beam 21 is high. Fourth, the flying stability of the magnetic head slider 35 is excellent due to the above first, second and third features. The fifth feature of the mechanism 20 is such that the first pair of beams 31 and 32 has a short length $l_{11}$ and is formed in the same plane. Hence, the first pair of beams 31 and 32 has a large strength with respect to force received in the contact start/stop operation, and a shear failure does not easily occur in the beams 31 and 32. The sixth feature of the mechanism 20 is such that the stiffness of the lead wires 15A–15D does not affect the rotation stiffness of the gimbal 25.

As has been described above, the gimbal 25 is formed so that a pair of T-shaped beams (which form an H-shaped beam) is provided with respect to the center of the gimbal 25, and hence a low rotation stiffness and a high resonance frequency are achieved. More specifically, the rotation stiffness of the mechanism 20 becomes one-third of that of the aforementioned IBM 3380 type head supporting mechanism, while the resonance frequency of the mechanism 20 is as high as that of the IBM 3380 type head supporting mechanism. As a result, it becomes possible to stably fly a compact slider having a low airbearing stiffness.

Tables 1 and 2 show characteristics of the head supporting mechanism 20 according to the first embodiment of the present invention supporting a 2 mm-length slider, and the IBM 3380 type head supporting mechanism supporting which a 3.2 mm-length slider.

TABLE 1

COMPARISON OF STIFFNESS
(static characteristics by computer simulation)

| Stiffness | 1st embodiment | 3380 type |
|---|---|---|
| pitch stiffness | 1.5 grf cm/rad | 9.4 grf cm/rad |
| roll stiffness | 1.5 grf cm/rad | 5.1 grf cm/rad |
| up/down stiffness | 0.55 grf/mm | 2.4 grf/mm |
| equivalent weight ratio | 0.74 | 0.72 |

TABLE 2

COMPARISON OF RESONANCE FREQUENCY
(dynamic characteristic by computer simulation)

| Stiffness | 1st embodiment | 3380 type |
|---|---|---|
| 1st bend | 2.1 kHz | 2.1 kHz |
| 1st twist | 2.3 kHz | 2.6 kHz |
| in-plane | 8.5 kHz | 5.7 kHz |

In order to make the equivalent weight ratio ((supporting spring equivalent weight)/(slider weight) of the first embodiment equal to that of the IBM 3380 type mechanism, the total length of the supporting mechanism is short (10 mm), which is approximately half of that of the IBM 3380 type mechanism. Further, the thickness of the load beam 21 of the first embodiment is 25 $\mu$m. which is approximately one-third of that of the IBM 3380 type mechanism.

Table 1 shows data obtained by computer simulation. More specifically, Table 1 shows the pitch stiffness and roll stiffness of the gimbal 25 of the first embodiment, and the up/down stiffness of the load beam 21 thereof. Further, Table 1 shows the pitch stiffness and the roll stiffness of the gimbal of the IBM 3380 type mechanism, and the up/down stiffness of the load beam thereof. It can be seen from Table 1 that the rotation stiffness equal to one-third of the gimbal of the IBM 3380 type mechanism can be obtained by optimizing the width and length of the grooves in the gimbal 25.

Table 2 shows the resonance frequencies of the first embodiment and the conventional IBM 3380 type mechanism obtained by a computer simulation. The resonance frequencies of the first embodiment are similar to those of the IBM 3380 type mechanism.

As will be seen from the above, the magnetic head supporting mechanism according to the first embodiment of the present invention has a low stiffness and a high resonance frequency.

A description will now be given of a second embodiment of the present invention. In the following description, parts that are the same as those shown in FIG. 2 are given the same reference numbers.

Figure 8:
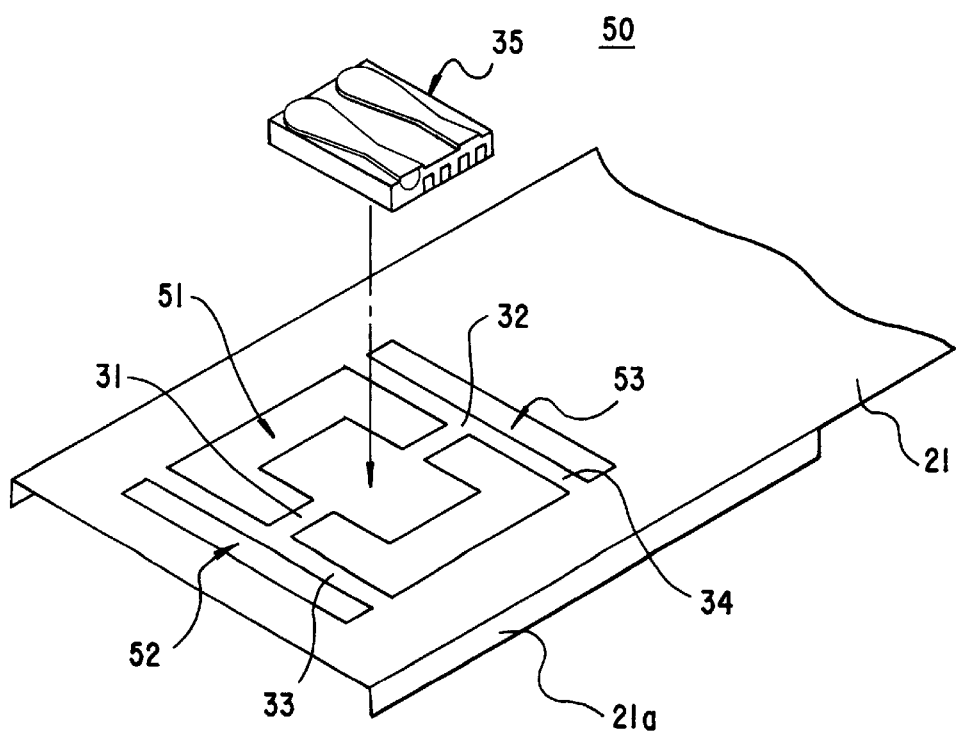
FIG. 8 is a perspective view of a magnetic head supporting mechanism according to a second embodiment of the present invention.

FIG. 8 shows a magnetic head supporting mechanism 50 according to the second embodiment of the present invention. The mechanism 50 includes a gimbal 51. The gimbal 51 is formed so that the gimbal 25 shown in FIG. 2 is rotated about the center 36 by 90°. Two T-shaped beams 52 and 53 are arranged in the longitudinal direction of the load beam 21.

Figure 9:
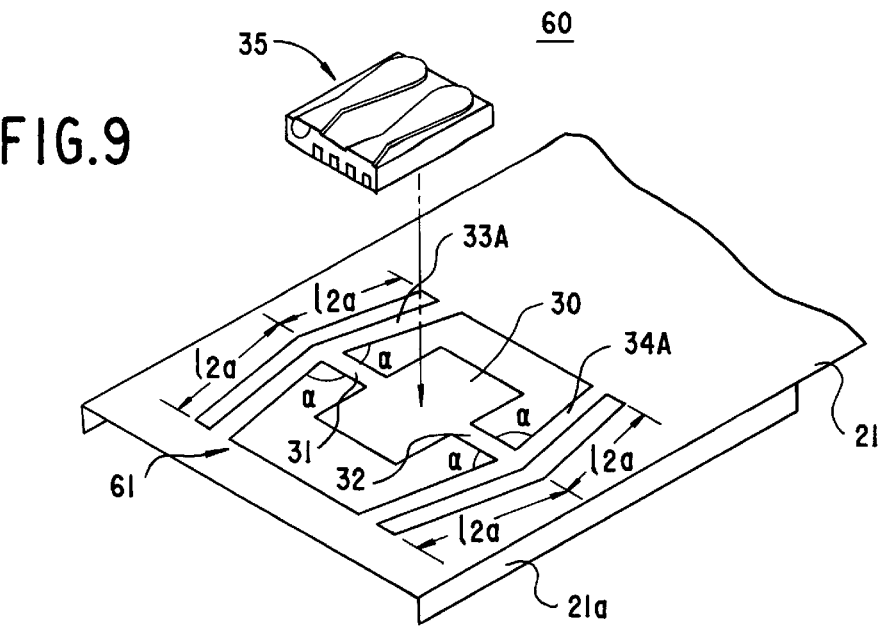
FIG. 9 is a perspective view of a magnetic head supporting mechanism according to a third embodiment of the present invention.

FIG. 9 shows a magnetic head supporting mechanism 60 having a gimbal 61 according to a third embodiment of the present invention. The gimbal 61 has the aforementioned first pair of beams 31 and 32, and a second pair of beams 33A and 34A. The beam 33A and the beam 31 form an acute angle $\alpha$. Similarly, the beam 34A and the beam 32 form an acute angle equal to the acute angle $\alpha$. With the above structure, it becomes possible to form, without increasing the width W1 of the load beam 21, the second pair of beams 33A and 34A so that the length $2 \times l_{2a}$ thereof is greater than the length $2 \times l_2$ of the second pair of beams 33 and 34 shown in FIG. 2. Further, it is possible to narrow the end of the load beam 21. Hence, the rotation stiffness of the gimbal 61 is less than that of the gimbal 25 shown in FIG. 2. Thus, the magnetic head slider 35 in the third embodiment can be more stably filed than that in the first embodiment shown in FIG. 2.

Figure 10:
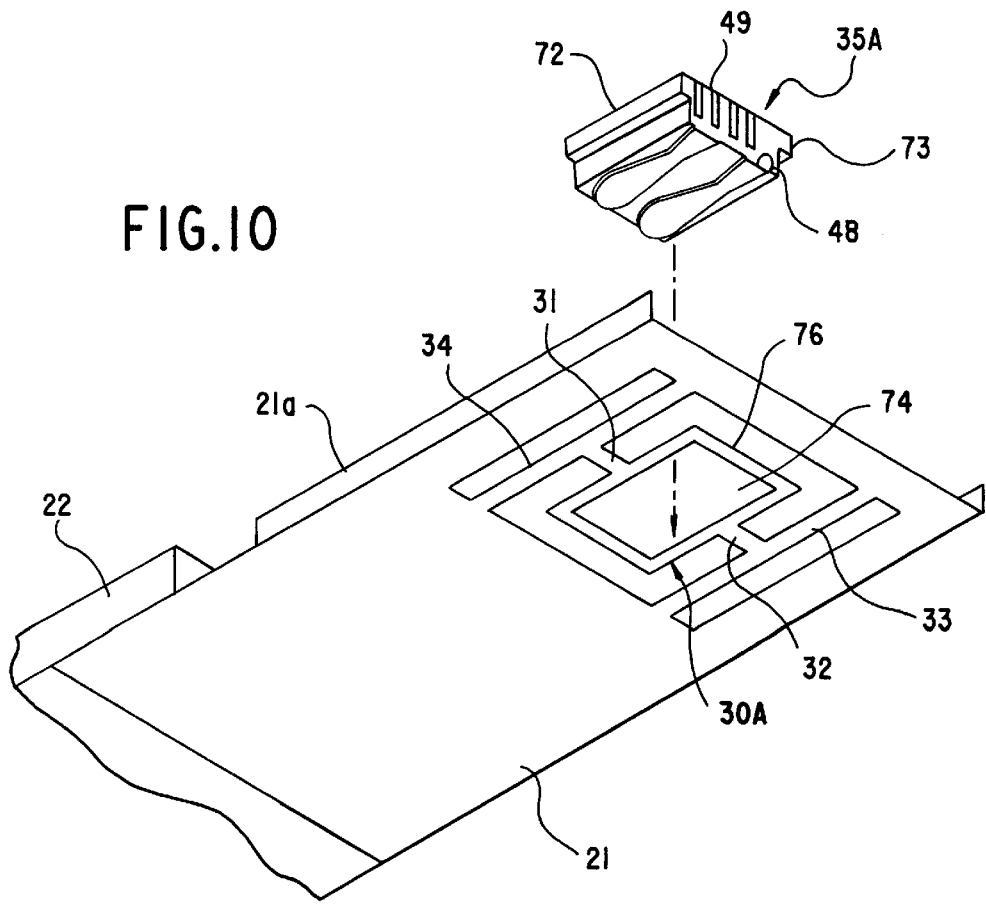
FIG. 10 is a perspective view of a magnetic head supporting mechanism according to a fourth embodiment of the present invention.

FIG. 10 shows a magnetic head supporting mechanism 70 having a gimbal 71 according to a fourth embodiment of the present invention. A magnetic head slider 35A of the mechanism 70 includes flanges 72 and 73 formed on the respective sides of the slider 35A. A magnetic head slider fixing portion 30A of the gimbal 71 includes an opening 74 having a size corresponding to the magnetic head slider 35A. The opening 74 is of a rectangular shape defined by a rectangular frame 76. As shown in FIG. 10, the magnetic head slider 35A engages the opening 74, and the flanges 72 and 73 are made to adhere to the frame 76 by means of an adhesive. In this manner, the magnetic head slider 35A is fixed to the magnetic head slider fixing portion 30A.

Figure 11:
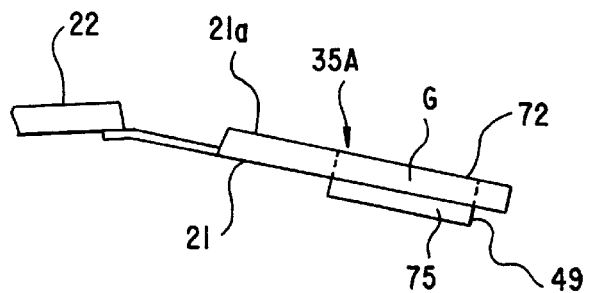
FIG. 11 is a side view of the mechanism shown in FIG. 10.

As shown in FIG. 11, the center G of gravity of the magnetic head slider 35A is substantially located on the surface of the load beam 21. Hence, in a seek operation, the magnetic head slider 35A is moved by exerting a force on the center G of gravity. Thus, an unnecessary rotation force about the center G of gravity of the magnetic head slider 35A does not occur, and the unbalance of the magnetic head slider 35A is reduced. As a result, the magnetic head slider 35A can stably fly in the seek operation.

Further, the height of the magnetic head assembly can be reduced. Hence, it is possible to laminate layers of the head at reduced intervals and to provide an increased number of disks per unit length. As a result, it is possible to increase the volume storage density of the magnetic disk drive and hence the storage density.

Figure 12:
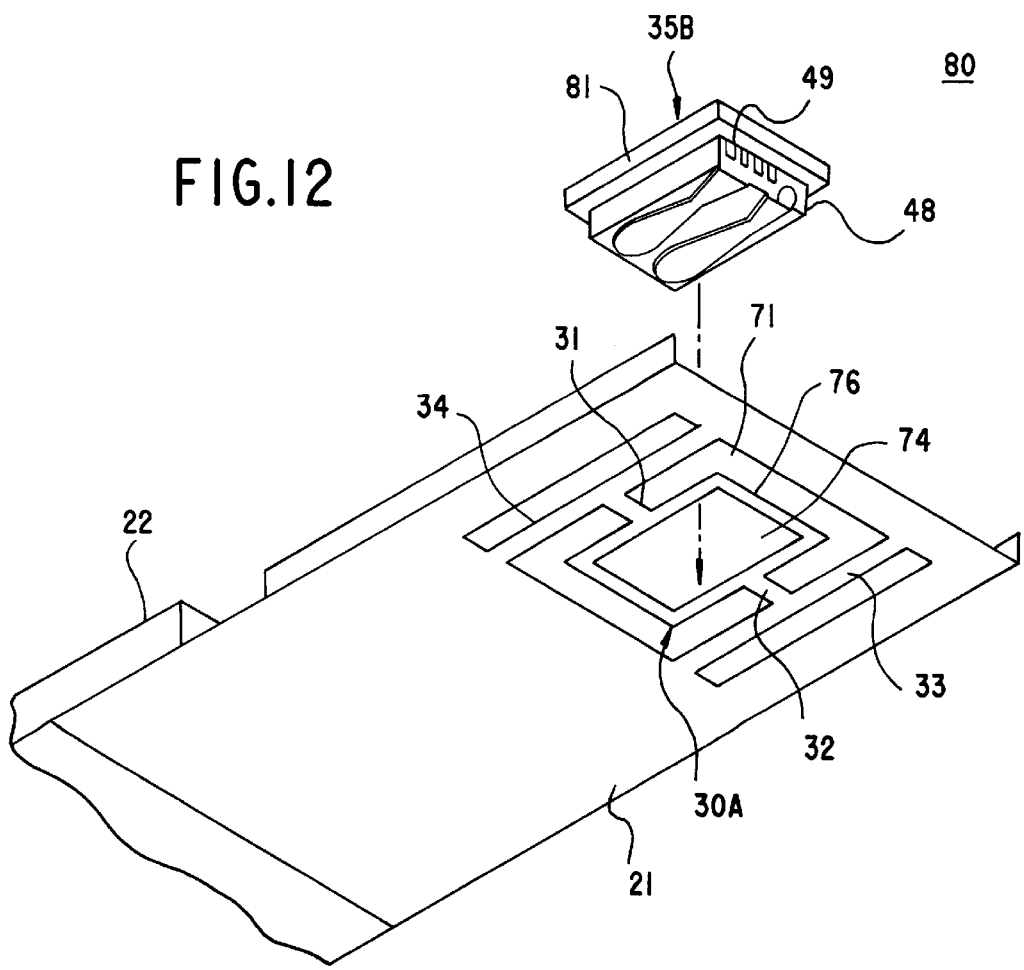
FIG. 12 is a perspective view of a magnetic head supporting mechanism according to a fifth embodiment of the present invention.

FIG. 12 shows a magnetic head supporting mechanism 80 having a magnetic head slider 35B according to a fifth embodiment of the present invention. The magnetic head slider 35B has a flange 81 formed around the circumference thereof. The magnetic head slider 35B engages the opening 74, and the flange 81 is made to adhere to the magnetic head slider fixing portion 30A by means of an adhesive. That is, the fifth embodiment of the present invention differs from the fourth embodiment thereof in that the whole circumference of the magnetic head slider 35B is made to adhere to the fixing portion 30A. Hence, the adhesive strength is increased and the reliability of the magnetic head supporting mechanism is improved.

Figure 13:
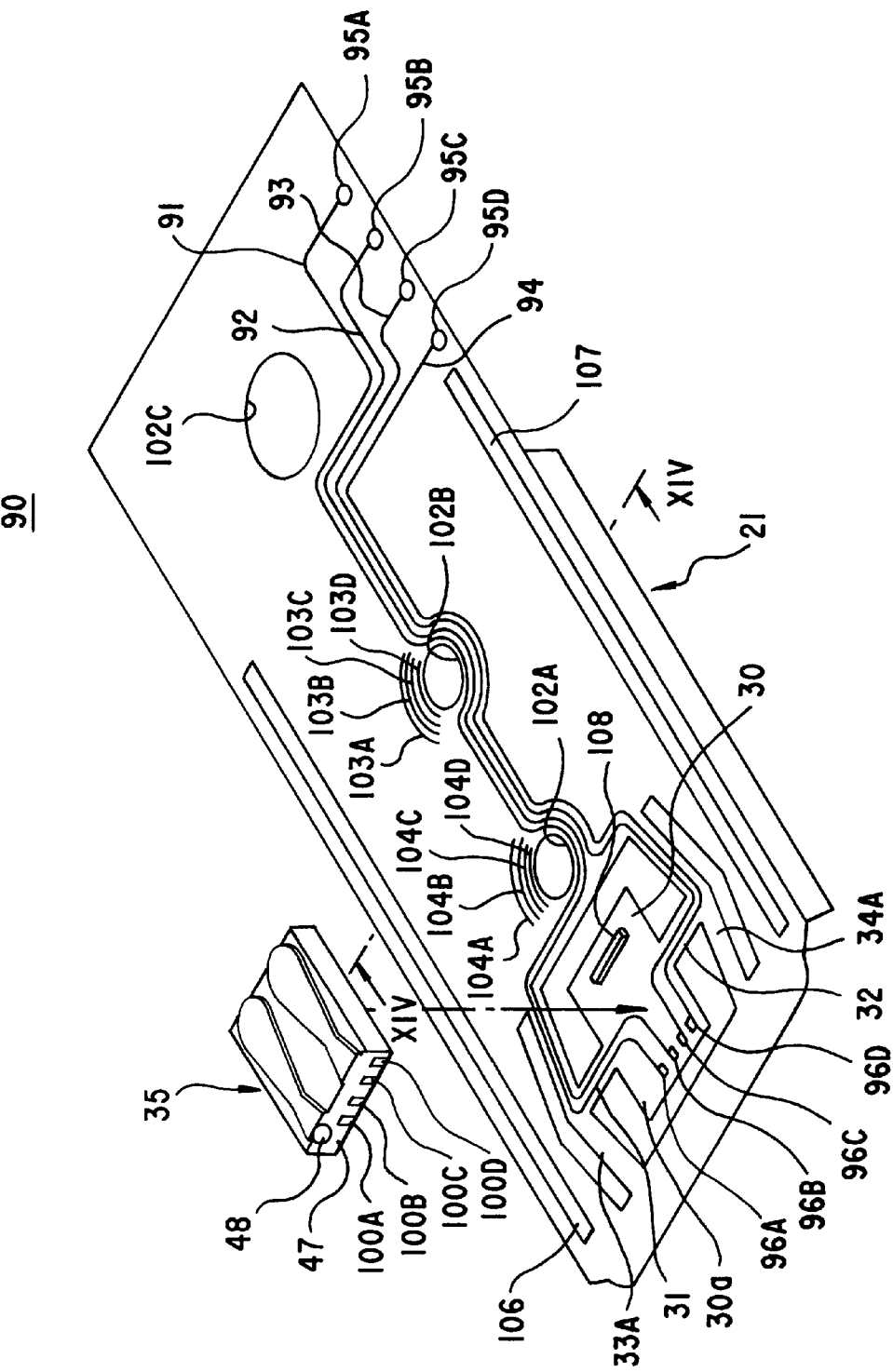
FIG. 13 is a perspective view of a magnetic head supporting mechanism according to a sixth embodiment of the present invention.
Figure 14:
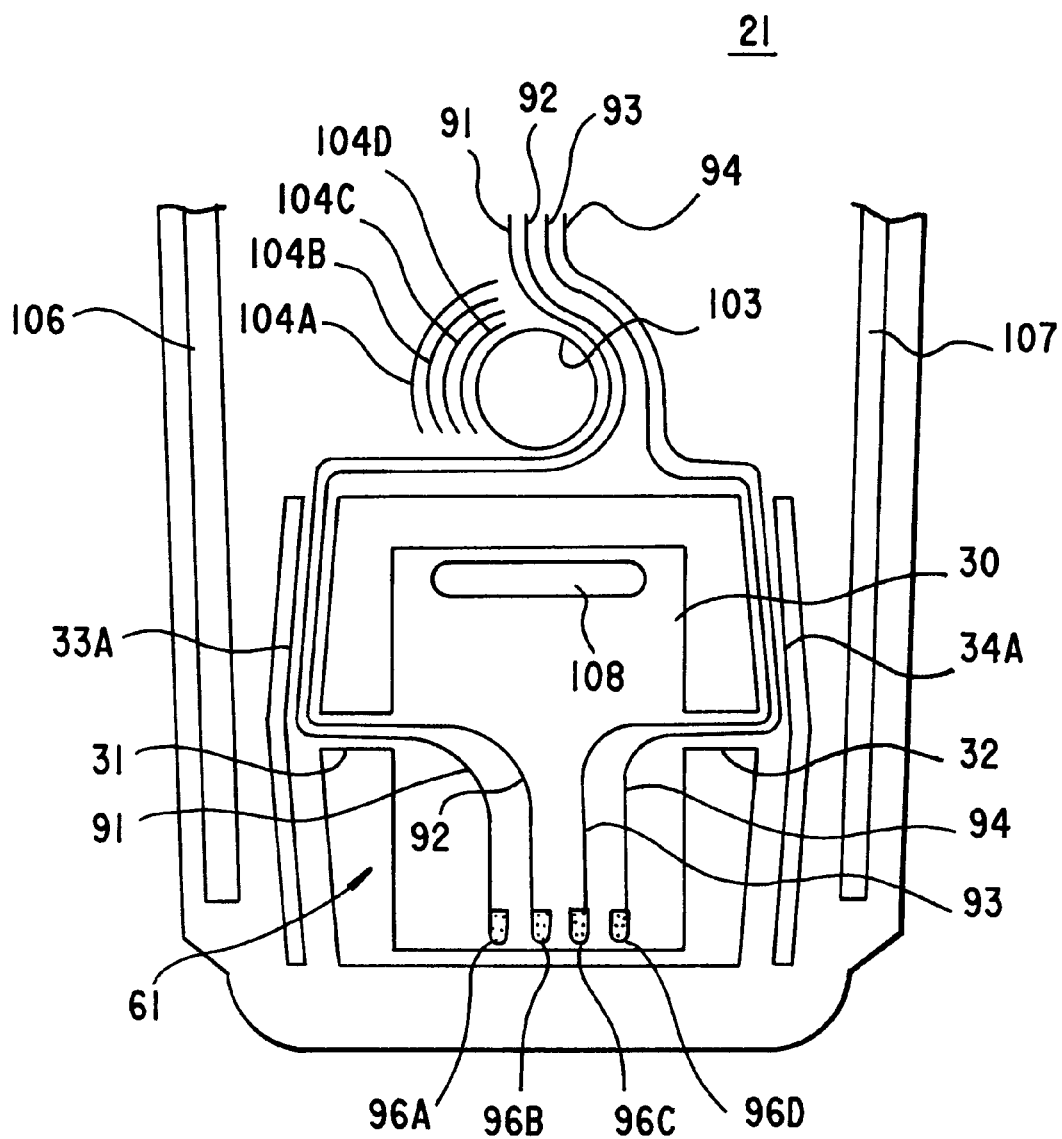
FIG. 14 is a plan view of a free-end part of a load beam shown in FIG. 13.

FIG. 13 shows a magnetic head supporting mechanism 90 according to a sixth embodiment of the present invention. FIG. 14 shows a free end of a load beam of the magnetic head supporting mechanism 90. The mechanism 90 is designed so that it does not have any influence of the stiffness of lead wires, which affect flying of the slider having a low airbearing stiffness. For example, when, in the case where four lead wires are connected between the slider and the load beam (see FIG. 6), each of the lead wires has a diameter of 30 μm and has an additional length (free length) of 1 mm, the rotation stiffness of the gimbal is approximately five times that of the gimbal in which there is no lead wire. This degrades the flying stability of the slider.

The magnetic head supporting mechanism 90 has wiring patterns 91, 92, 93 and 94, which are formed by patterning a copper thin film formed by, for example, plating by means of the photolithography technique. The wiring patterns 91–94 extend on a central portion of the lower surface of the load beam 21 in the longitudinal direction. Each of the wiring patterns 91–94 is approximately 5 μm thick and 50 μm wide. The thickness and width of the wiring patterns depend on the resistance of the conductive pattern and the capacity of the load beam 21.

Terminals 95A–95D made of copper are formed on the base portion of the load beam 21. Further, terminals 96A–96D are formed in a terminal area 30a of the magnetic head slider fixing portion 30 of the gimbal 25. The tops of the terminals 95A–95D and 96A–96D are plated by, for example, Au. This plating contributes to preventing exposure of copper and improving the bonding performance. Ends of the wiring patterns 91, 92, 93 and 94 are respectively connected to the terminals 95A, 95B, 95C and 95D. The other ends of the two wiring patterns 91 and 92 extend along the beams 33A and 31, and are connected to the terminals 96A and 96B, respectively. The other ends of the wiring patterns 93 and 94 extend along the beams 34A and 32 and are connected to the terminals 96C and 96D, respectively.

Figure 15:
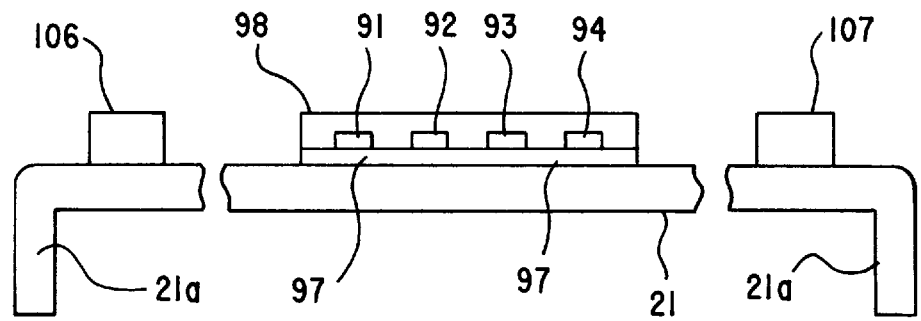
FIG. 15 is a sectional-view taken along a line XIV—XIV shown in FIG. 13.

As shown in FIG. 15, the wiring patterns 91, 92, 93 and 94 are electrically insulated from the load beam 21 by means of an insulating film 97, and are covered by a protection film 98. The insulating film 97 and the protection film 98 are made of photosensitive polyimide and are grown to a thickness of approximately 5 μm. The insulating film 97 and the protection film 98 are respectively patterned by the photolithography technique. The thickness of the insulating film 97 is determined on the basis of a capacitance between the conductive pattern (made of Cu) and the load beam (made of stainless steel).

As will be described later, polyimide has heat-resistance enough for an annealing process. Since polyimide has photosensitivity, it can be easily patterned. Further, the polyimide films 97 and 98 have corrosion resistance, and excellent reliability.

It is likely that the terminals 95A–95D and 96A–96D are etched because these terminals are not covered by the protection film 98. In order to prevent the terminals 95A–95D and 96A–96D from being etched, the surfaces of these terminals are covered by an Au film (not shown) having a thickness of approximately 1 μm formed by plating or vapor deposition.

Figure 16:
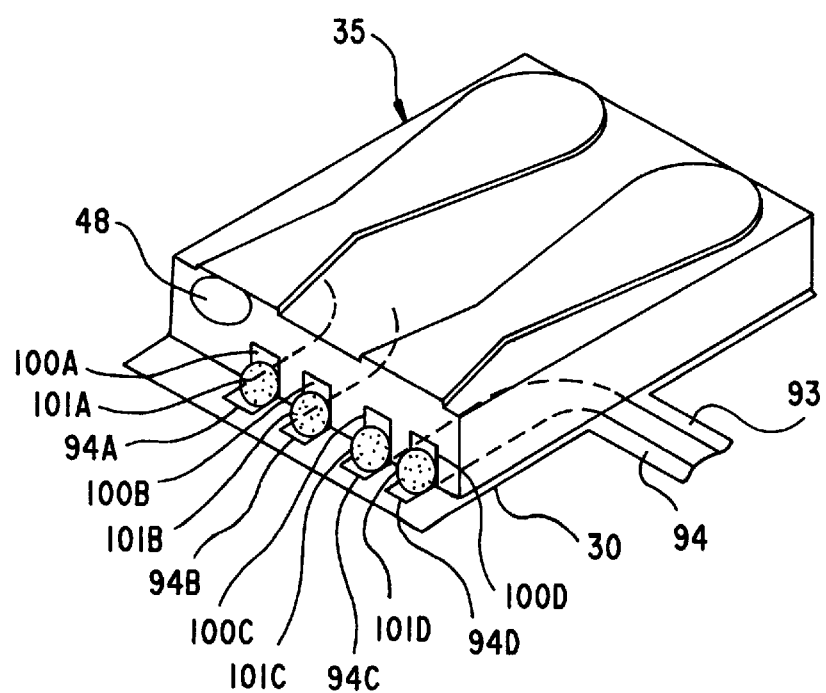
FIG. 16 is a perspective view of a magnetic head slider shown in FIG. 13.

As shown in FIG. 16, the magnetic head slider 35 is adhered to the fixing portion 30 by means of an adhesive. The terminals 96A–96D are located at a right angle with respect to terminals 100A–100D of the magnetic head 48 formed on the end surface of the magnetic head slider 35, and are respectively connected to the terminals 100A–100D by means of Au balls 101A–101D. The Au balls 101A–101D are formed by means of, for example, a gold ball bonding device. In order to facilitate bonding, the terminals 96A–96D and terminals 100A–100D are located as shown in FIG. 16. In order to facilitate a crimp operation on the Au balls 101A–101D, the terminals 100A–100D are long in the direction of the height of the magnetic head slider 35 and are located so that these terminals 100A–100D face the terminals 96A–96D in the state where the head slider 35 is fixed to the fixing portion 30.

The wiring patterns 91–94 bypass holes 102A, 102B and 102C, as shown in FIG. 13 and extend up to an area close to the head slider 35. The hole 102C is used to fix the load beam 21 to the arm 22 (not shown in FIG. 13). The holes 102A, 102B and 102C are sized such that a tool can be inserted therein.

As shown in FIGS. 13 and 14, dummy patterns 103A–103D and 104A–104D are provided so that these dummy patterns are symmetrical to the bypassing portions of the wiring patterns 91–94 with respect to the holes 102A and 102B. The insulating film 97 and the protection film 98 are provided for the dummy patterns 103A–103D and 104A–104D in the same manner as the wiring patterns 91–94. The dummy patterns 103A–103D and 104A–104D are provided in order to balance the mechanical stiffness of the load beam 21 in the direction of the width of the load beam 21.

As shown in FIG. 14, the wiring patterns 91–94 are arranged so that these patterns form a loop. This loop functions as an antenna, which receives noise components contained in the head signals. As the size of the loop is increased, the degree of the noise components is increased. In order to reduce the size of the loop, the wiring patterns 91 and 92 respectively connected to the terminals 96A and 96B are arranged between the hole 102A and the magnetic head slider 35, and all the wiring patterns 91–94 are gathered in the vicinity of the hole 102A. In order to balance the stiffness in the direction of the width of the load beam, the dummy patterns 104A–104D are,formed. For the same reason as above, the dummy patterns 103A–103D are formed in the vicinity of the hole 102B.

As shown in FIG. 14, auxiliary films 106 and 107 having a belt shape are formed along the right and left ends of the load beam 21. The auxiliary films 106 and 107 are provided in order to receive a clamping force generated when the load beam 21 is clamped in a bending process which will be described later. Such a clamping force is also received by the wiring patterns 91–94. The clamping force is distributed so that the clamping force is exerted on not only the wiring patterns 91–94 but also the auxiliary films 106 and 107. Hence, it is possible to prevent the wiring patterns 91–94 from being damaged.

As shown in FIGS. 13 and 14, a convex dummy pattern 108 is provided in order to prevent an adhesive from flowing from the fixing portion 30 when the slider 35 is fixed to the fixing portion 30 and to prevent the slider 35 from being tilted due to the thickness of the wiring patterns. More particularly, the convex pattern 108 is used to form a groove in which adhesive used to fix the slider 35 is saved between the pattern 108 and the terminals 96A–96D. Further, the convex pattern 108 is designed to have the same height as the patterns having the terminals 96A–96D. If the dummy pattern 108 is not used, the slider 35 will be inclined with respect to the fixing portion 30 due to the height of the terminals 94A–94D. This degrades the flying stability of the heads. The convex pattern 108 can be formed by a cooper-plated thin film similar to the wiring patterns 91–94. The protection film 98 covers the convex pattern 108. The adhesive is provided on a step part between the wiring patterns and the convex pattern 108.

Figure 17:
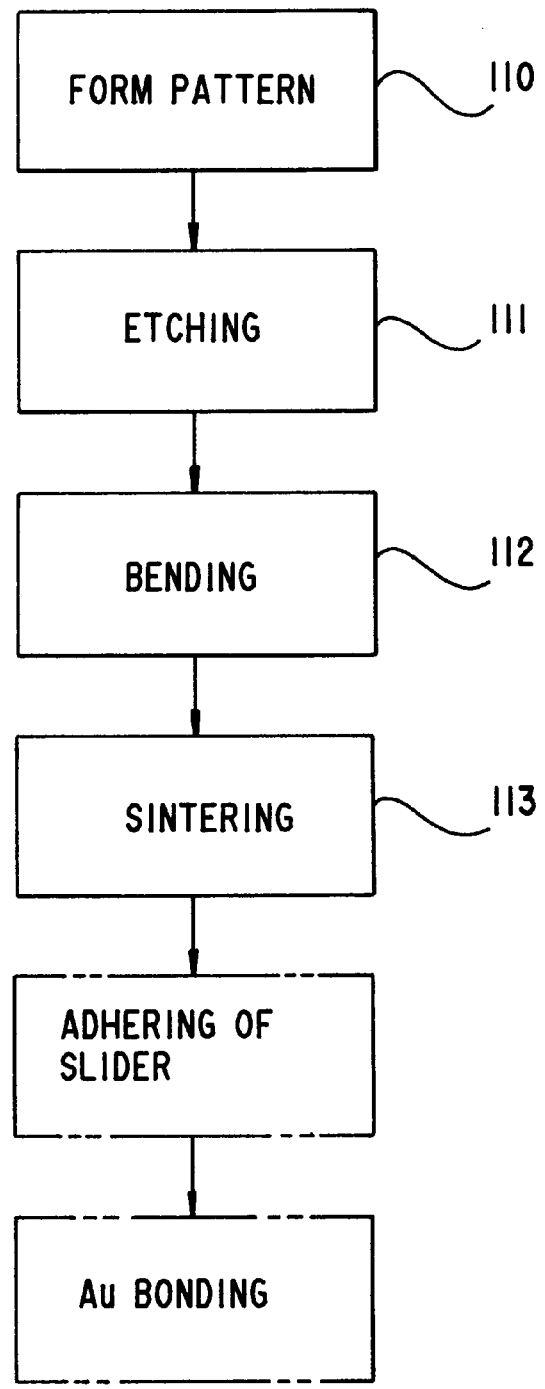
FIG. 17 is a flowchart of a production process for the load beam shown in FIG. 13.

The load beam 21 is produced by a process shown in FIG. 17. First, a pattern formation step 110 is performed. More particularly, photosensitive polyimide is coated on a stain-less plate. The insulating film 97 is formed by the photolithography technique. A copper film is formed by the plating process, the vapor deposition process or the like, and is patterned into the wiring patterns 91–94 by the photolithography technique. Thereafter, photosensitive polyimide is coated and is patterned into the protection film 98 and the auxiliary films 106 and 107 by the photolithography technique. Polyimide can be coated by a spin-coat process, and is patterned and etched. A thin film, such as a Cr film, can be formed in order to improve the adhesiveness between the insulating film and the Cu film and between the Cu film and the protection film and to improve the reliability of the adhesion.

Figure 18:
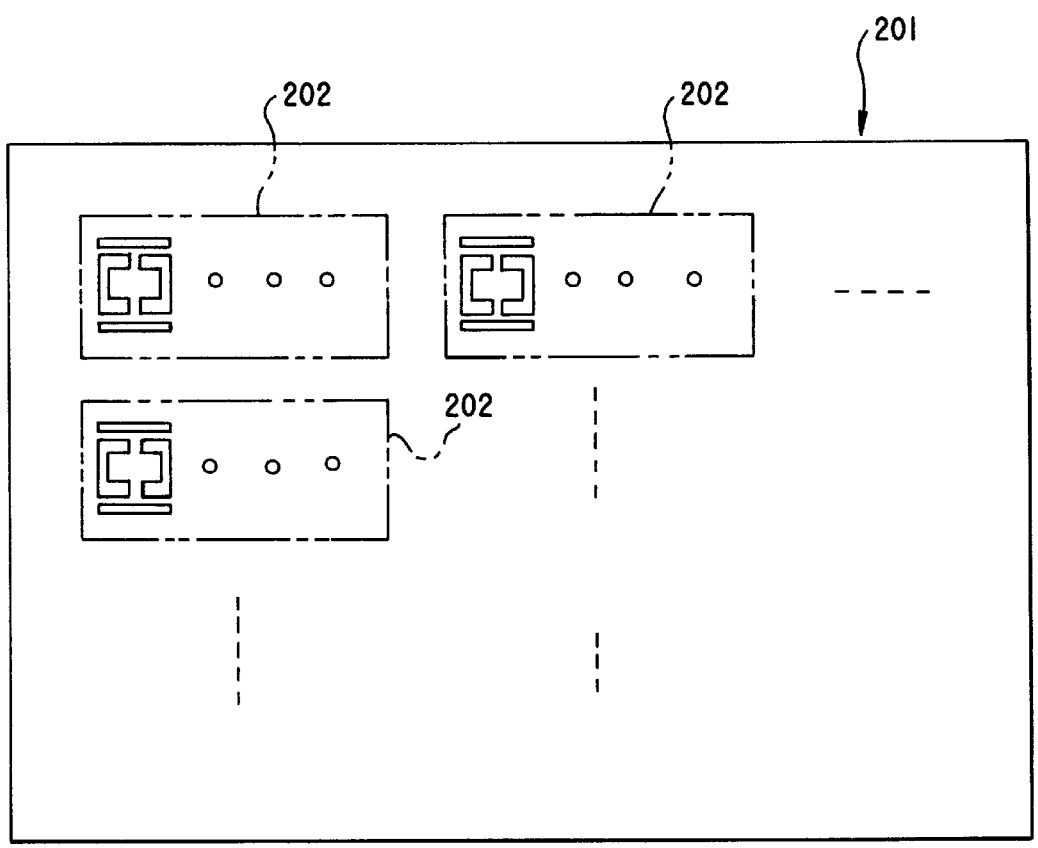
FIG. 18 is a plan view of a plate obtained after an etching step shown in FIG. 17 is carried out.

Next, an etching step 111 is performed in order to form the openings 26–29 and the holes 102A–102C and the outward form of the load beam in the stainless plate. FIG. 18 shows load beams 202 before punching for cutting off bridge portions (not shown) to provide pieces, so that the load beams 202 are formed in a stainless plate 201 and arranged in rows and columns.

Then, a bending step 112 is performed by bending the respective ends of each of the load beams 202 formed in the stainless plate 201, so that ribs 21a are formed. The bending step 112 can be performed by press so that the load beams 202 are processed at the same time.

Finally, an annealing step 113 is performed at a temperature of approximately 400° C., so that internal stress can be removed. Further, a slider adhering step and an Au bonding step can be automatically carried out before the load beams 202 are punched. Hence, it is possible to automatically perform the production process shown in FIG. 17 and reduce the number of steps and the cost thereof.

Figure 19:
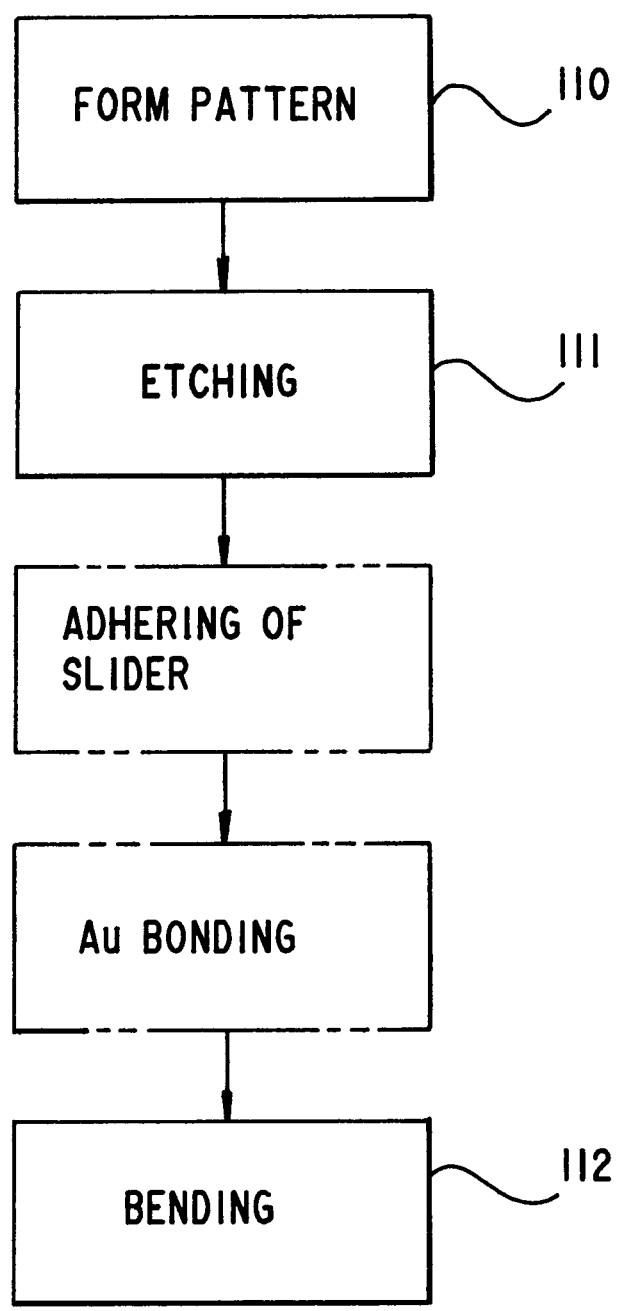
FIG. 19 is a flowchart of another production process for the load beam shown in FIG. 13.

The load beam 21 can be produced without performing the annealing step 113. In this case, as is shown in FIG. 19, the pattern formation step 110 and the etching step 111 are performed, and subsequently the slider adhering step and the Au bonding step are carried out. Thereafter, the bending step 112 is carried out to form the ribs 21a.

Figure 20:
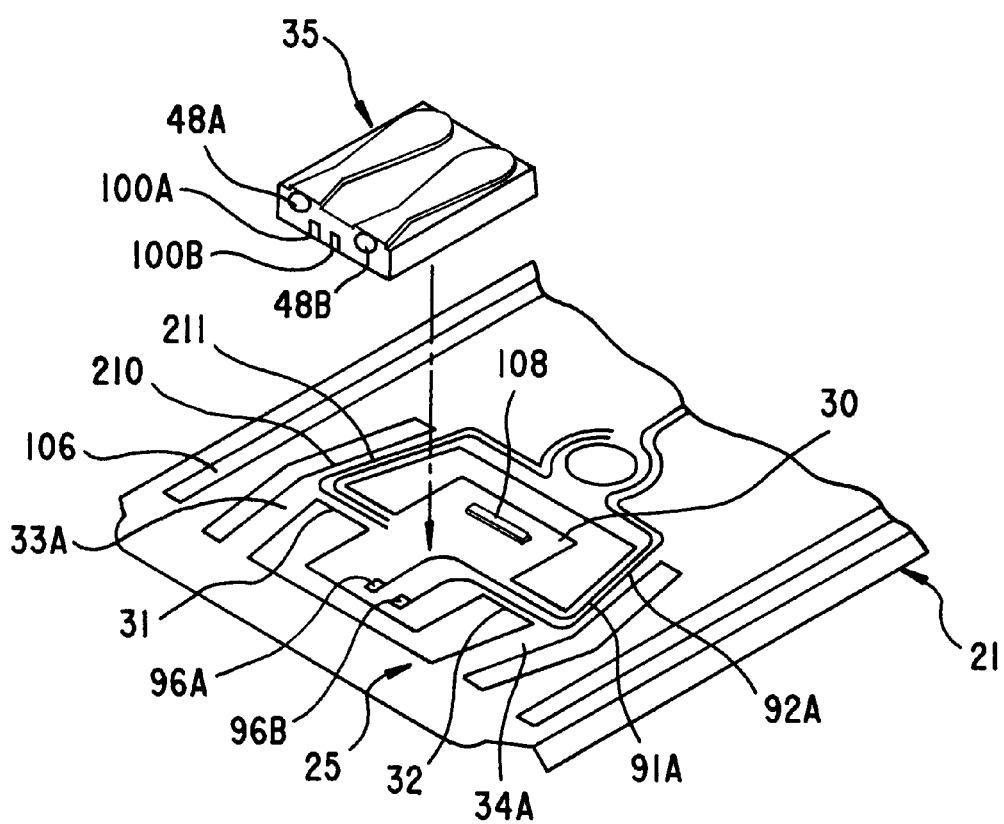
FIG. 20 is a perspective view of a variation of the sixth embodiment of the present invention.

As shown in FIG. 20, when interactive type heads 48A and 48B for recording and reproduction are used as magnetic heads, the magnetic head slider 35 has the aforementioned two terminals 100A and 100B. In the gimbal 25, the two wiring patterns 91A and 92A are provided so that these wiring patterns extend on only the beams 32 and 34A, while two dummy patterns 210 and 211 are provided so as to extend on the beam 31 and 33A in order to balance the mechanical stiffness of the load beam 21 in the direction of the width of the load beam 21.

The magnetic head supporting mechanism 90 has the following features.

First, since the wiring patterns 91–94 are formed on the load beam 21, it is not necessary to provide tubes for passing the lead wires through the load beam 21. Hence, it is possible to prevent unbalanced force caused by the lead wires and tubes from being exerted on the magnetic head slider 35 and to stably fly the magnetic head slider 35.

Second, due to use of the dummy patterns 103A–103D and 104A–104D, the rotation stiffness of the load beam 21 does not have polarity. Hence, the magnetic head slider can fly stably.

Third, the crimp connection using the Au balls 101A–101D enables automatic assembly and non-bire bire bonding between head terminals and pattern terminals.

In the aforementioned embodiments of the present invention, the beams may be curved.

A description will now be given of a magnetic head supporting mechanism suitable for a more compact magnetic disk drive according to a seventh embodiment of the present invention.

Figure 21:
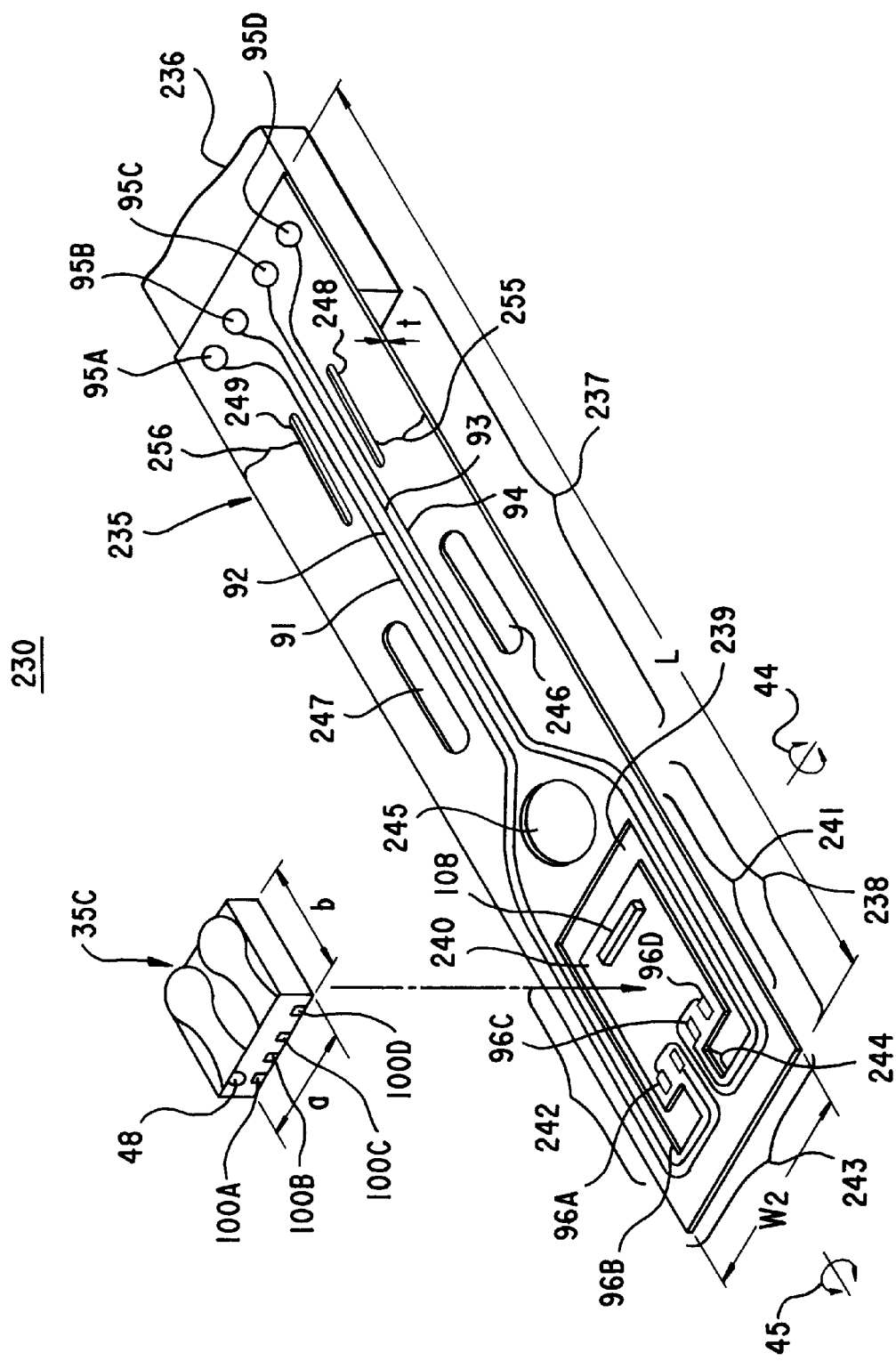
FIG. 21 is a perspective view of a magnetic head supporting mechanism according to a seventh embodiment of the present invention.
Figure 22:
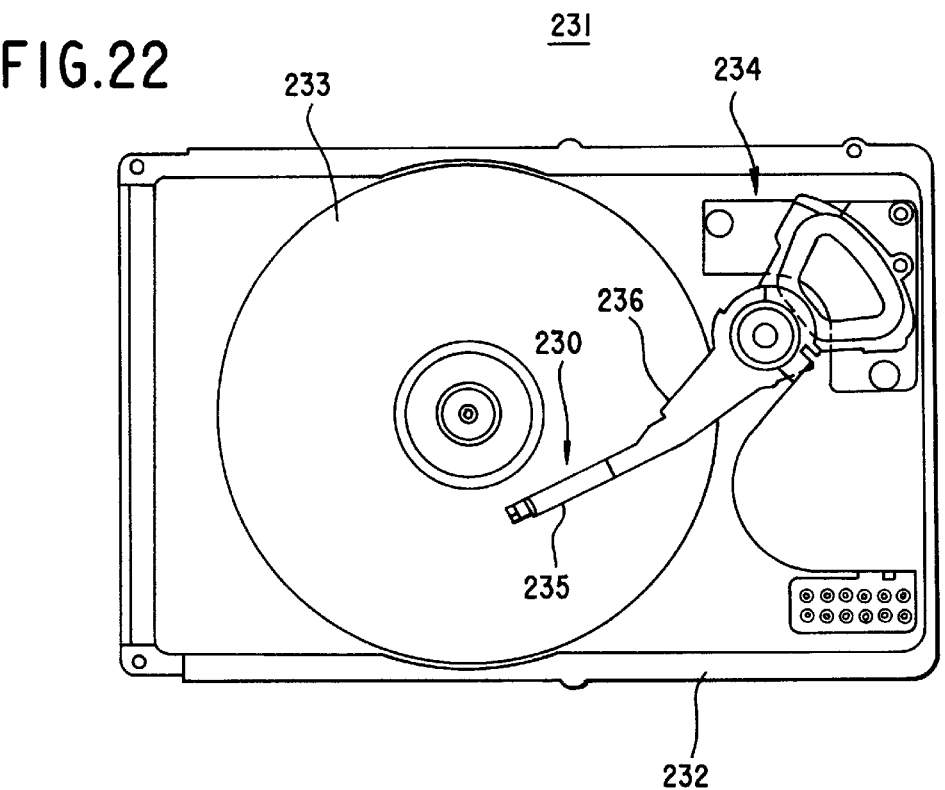
FIG. 22 is a plan view of a magnetic disk drive to which the magnetic head supporting mechanism shown in FIG. 21 is applied.

FIG. 21 shows a back surface of a magnetic head supporting mechanism 230 according to the seventh embodiment of the present invention. FIG. 22 shows a 1.8-inch-type magnetic disk drive 231 to which the magnetic head supporting mechanism 230 is applied.

The magnetic disk drive 231 has an enclosure 232 having almost the same dimensions as those of an IC memory card. In the enclosure 232, provided are a magnetic disk 233 having a diameter of 1.8 inches, and an actuator to which two sets of magnetic head supporting mechanisms are attached. The magnetic disk drive 231 is more compact than the magnetic disk drive 220 shown in FIG. 3.

A magnetic head slider 35C is made compact in accordance with light-sizing of the magnetic disk drive 231. More particularly, dimensions a×b of the magnetic head slider 35C are 0.8 mm×1.0 mm, and are approximately one-quarter the area of the magnetic head slider 35 shown in FIG. 2. In order to stably fly the compact magnetic head slider 35C, it is necessary to considerably reduce the stiffness without decreasing the resonance frequency, as compared with the magnetic head supporting mechanism 30.

A load beam 235 shown in FIG. 21 is made of stainless, and has a base portion fixed to an arm 236 of the actuator 234 (see FIG. 22). The load beam 235 has a width W2 of approximately 2 mm, a length L of approximately 9 mm, and a thickness to of approximately 25 μm. and is approximately a half of the volume of the load beam 21 shown in FIG. 2. The load beam 235 is diminished, and hence the resonance frequency of bending which will be described later is high.

The load beam 235 is a sheet-shaped piece, and a flat plate piece to which a bending process has not been subjected. Hence, there is no problem of a bending process error which degrades the flying stability of the magnetic head slider. The load beam 235 includes a load beam main body 237 and a gimbal 238 located on the end side of the load beam 235. The gimbal 238 has a substantially U-shaped opening (through hole) 239 formed in the load beam 235. The gimbal 238 includes a magnetic head slider fixing portion 240, a first beam 241, a second beam 242, a third beam 244, and a connecting portion 243.

The magnetic head slider fixing portion 240 has a size corresponding to the magnetic head slider 35C. The first beam 241 and the second beam 242 extend along respective longitudinal ends of the load beam 235 from the end thereof. The connecting portion 243 extends in the direction of the width of the load beam 235, and connects the first beam 241 and the second beam 242 together. The third beam 244 extends from the connecting portion 243 to the magnetic head slider fixing portion 240 in the longitudinal direction of the load beam 235. The magnetic head slider fixing portion 240 is connected to the main body 237 of the load beam 235 via the third beam 244, the connecting portion 243 and the first and second beams 241 and 242. Hence, the rotation stiffness of the load beam 230 can be reduced to a small value due to bending of the entire beams.

As shown in FIG. 21, holes 245, 246 and 247 with which a tool is engaged, and a pair of slits 248 and 249 are formed in the main body 237 of the load beam 235. Adjustment slits 248 and 249 are used to reduce the rotation stiffness of the load beam. The holes 245, 246 and 247 and the slits 248 and 249 are formed by etching. The connectors 95A–95D, 96A–96D and the wiring patterns 91–94 are formed symmetrically with respect to the longitudinal direction of the load beam 235. The magnetic head slider 35C is made to adhere to the fixing portion 240, and the terminals 96A–96D and 100A–100D are respectively connected to each other by means of Au balls as in the case shown in FIG. 16.

The structure shown in FIG. 21 does not use dummy patterns because the length and the width of the load beam 235 are less than those of the load beam shown in FIG. 13 and the loop formed by the wiring patterns is smaller than that shown in FIG. 13. However, it is preferable to arrange the wiring patterns and provide the dummy patterns as shown in FIGS. 13 and 14 in order to reduce the noise from the heads.

Figure 23A:
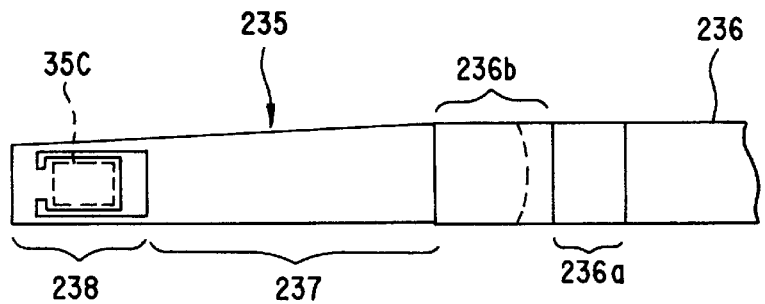
FIGS. 23A and 23B are respectively plan and side views of the magnetic head supporting mechanism shown in FIG. 21.
Figure 23B:
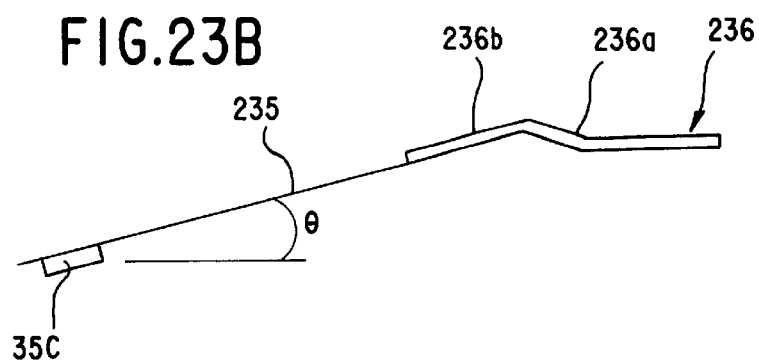

As shown in FIGS. 23A and 23B, the free end of the arm 236 is bent so that a substantially V-shaped cross section of the arm 236 is formed in which the "V" is inverted. The free end of the arm 236 has an upward slant portion 236a and a downward slant portion 236b declined at an angle θ with respect to the horizontal direction.

Figure 24:
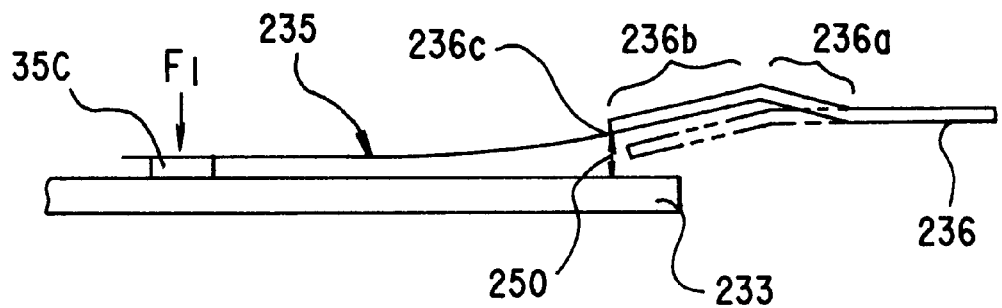
FIG. 24 is a side view of a state observed when the magnetic head supporting mechanism shown in FIG. 21 is provided in the magnetic disk drive.

The magnetic disk drive 231 uses two magnetic head supporting mechanisms 230 so that the single magnetic disk 233 is sandwiched between the mechanisms 230. As shown in FIG. 24, the load beam 235 causes the magnetic head slider 35C to come into contact with the magnetic disk 233 when the magnetic disk 233 is not being rotated. At this time, the main body 237 of the load beam 235 is caused to be bent and elastically deformed. The elastic force stored in the main body 237 of the load beam 235 generates a load F1, which urges the magnetic head slider 35C towards the magnetic disk 233.

Since the arm 236 is bent in the form of the inverted "V", a wide gap 250 can be formed between an end 236c of the arm 236 and the magnetic disk 233, as compared with a case indicated by a two-dot chained line in which the arm 236 is simply bent downwards.

Figure 25:
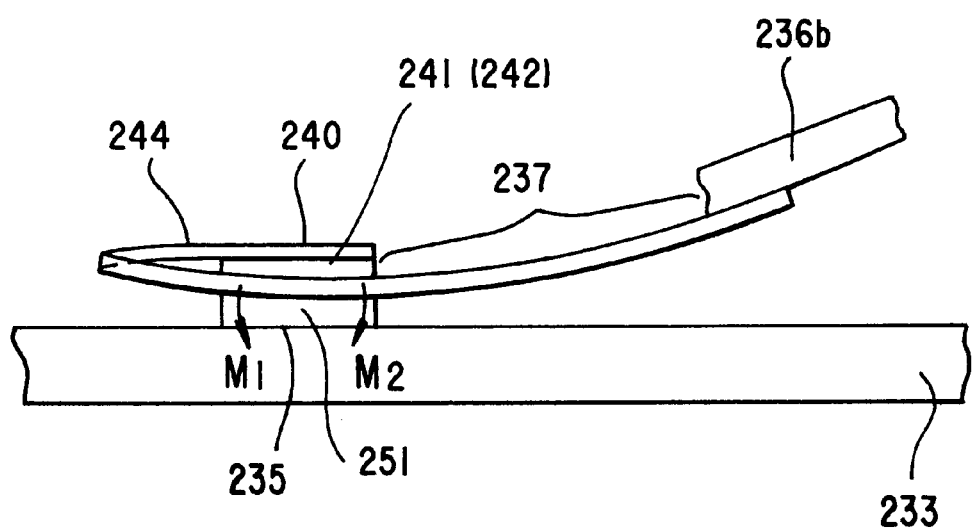
FIG. 25 is an emphasized view of the state in FIG. 24.

A description will now be given of a moment exerted on the magnetic head slider 35C by means of the load beam 235 when the load beam is loaded on the disk. As shown in FIG. 25, the main body 237 of the load beam 235 and the third beam 244 are bent. Hence, a moment is exerted by a center 251 of the magnetic head slider 35C. A moment M1 directed counterclockwise is exerted by the load beam main body 237 and the first and second beams 241 and 242. A moment M2 directed clockwise is exerted on the third beam 244. The dimensions of the load beam 235 are selected so that the moments M1 and M2 are balanced. For example, the load beam 235 is 9 mm long, and the gimbal 238 is 2.5 mm long. Further, the length and width of the main body 235 of the load beam 237 are 5.7 mm and 2 mm, respectively. With the above structure, it is possible to stably fly the magnetic head slider 35C.

A description will now be given, with reference to FIG. 21, of pitching and rolling of the magnetic head slider 35C.

(1) Pitching

The magnetic head slider 35C is rotated in the pitching direction indicated by arrow 44 in such a manner that the first, second and third beams 241, 242 and 244 and the load beam main body 237 are bent. At this time, all the beams 241, 242 and 244 are bent so as to be deformed in the form of arch shapes. The gimbal 238 is bent and hence the load beam main body 237 is bent. Hence, the pitch stiffness can be greatly reduced.

(2) Rolling

The magnetic head slider 35C is rotated in the rolling direction indicated by arrow 45 in such a manner that the first and second beams 241 and 242 are respectively bent in the opposite directions and the load beam main body 237 is twisted. At this time, the gimbal 238 is bent and hence the load beam main body 237 is bent. Hence, the rolling stiffness can be greatly reduced.

A description will now be given of the first-order bend and the first-order twist of the magnetic head supporting mechanism 230 obtained when the load beam is vibrated.

(1) First-order Bend

Figure 26:
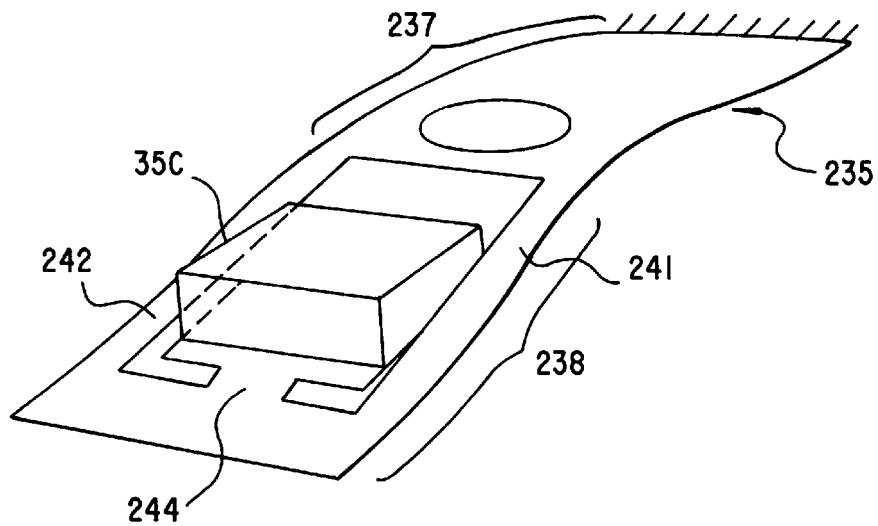
FIG. 26 is a side view of a first-order bend state of a load beam used in the seventh embodiment of the present invention.

The load beam 235 is bent and deformed, as shown in FIG. 26. More specifically, the load beam main body 237, and the first, second and third beams 241, 242 and 244 of the gimbal 238 are bent as shown in FIG. 24. The overall load beam 235 is formed flexibly, but the resonance frequency of the first-order bend is high, while the stiffness is small.

(2) First-order Twist

Figure 27:
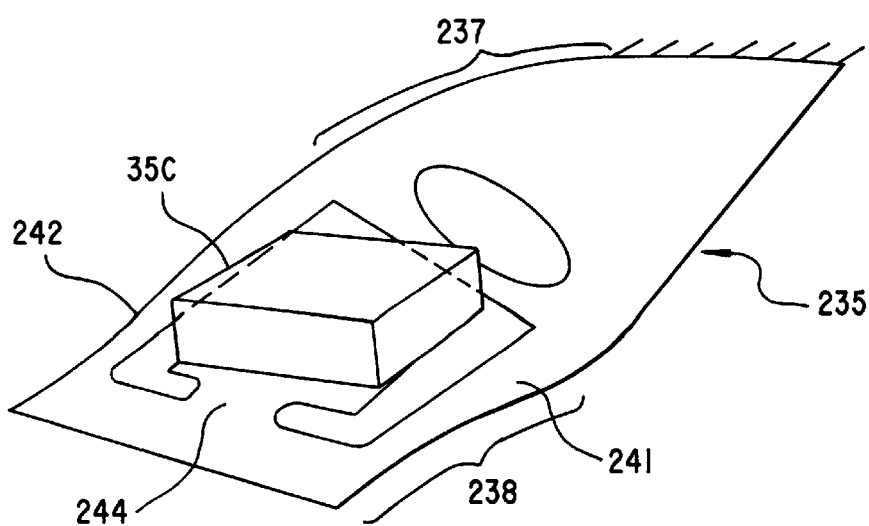
FIG. 27 is a side view of a first-order twist state of the load beam used in the seventh embodiment of the present invention.

The load beam 235 is twisted as shown in FIG. 27. The gimbal 238 is deformed and hence the load beam main body 237 is deformed. Hence, the overall load beam 235 is flexibly formed, but the resonance frequency of the first-order twist is high while the stiffness thereof is low.

Tables 3 and 4 show characteristics of the magnetic head support mechanism 230 according to the seventh embodiment of the present invention and the magnetic head supporting mechanism 30 of the first embodiment thereof shown in FIG. 2.

TABLE 3

COMPARISON OF STIFFNESS
(static characteristics by computer simulation)

| Stiffness | 7th embodiment | 1st embodiment |
| --- | --- | --- |
| pitch stiffness | 0.44 grf cm/rad | 1.5 grf cm/rad |
| roll stiffness | 0.24 grf cm/rad | 1.5 grf cm/rad |
| up/down stiffness | 0.36 grf/mm | 0.55 grf/mm |
| equivalent weight ratio | 0.76 | 0.74 |

TABLE 4

COMPARISON OF RESONANCE FREQUENCY
(dynamic characteristic by computer simulation

| Stiffness | 7th embodiment | 1st embodiment |
| --- | --- | --- |
| 1st bend | 1.6 kHz | 2.1 kHz |
| 1st twist | 4.4 kHz | 2.3 kHz |
| in-plane | 7.1 kHz | 8.5 kHz |

More particularly, Table 3 the pitch stiffness, the roll stiffness, and the up/down stiffness of the load beam 235 obtained by means of a computer simulation. It can be from Table 3 that the pitch stiffness and the roll stiffness of the seventh embodiment of the present invention are approximately one-quarter of those of the first embodiment thereof.

Table 4 shows the resonance frequencies of the first and seventh embodiments of the present invention obtained by a computer simulation. It can be seen from Table 4 that the first-order bend resonance frequency, the first-order twist resonance frequency and the lateral resonance frequency are kept very high.

It can be seen from Tables 3 and 4 that the magnetic head supporting mechanism 230 according to the seventh embodiment of the present invention has a resonance frequency as high as that of the magnetic head supporting mechanism 30 according to the first embodiment, and stiffness much less than that of the mechanism 30. Hence, the compact magnetic head slider 35C can be stably filed.

In an alternative of the load beam, the base portion of the load beam 237 is bent, so that the load beam is supported in the same manner as shown in FIG. 2 and the load F1 shown in FIG. 24 is obtained. In this case, only portions 255 and 256 outside of the slits 248 and 249 are bent. Hence, unnecessary strain is not exerted on the wiring patterns 91–94 located between the slits 248 and 249.

Figure 28:
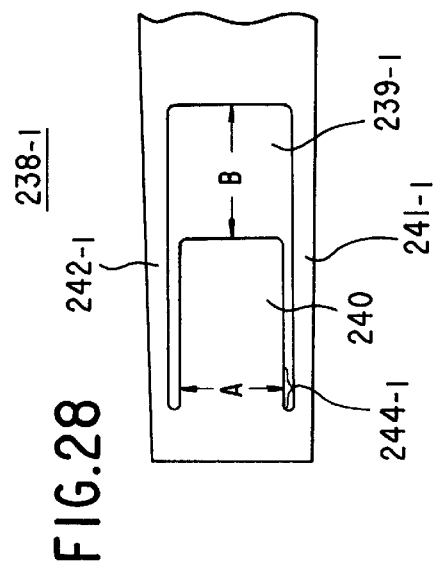
FIG. 28 is a plan view of a first variation of a gimbal of the load beam used in the seventh embodiment of the present invention.

A first variation of the gimbal 238 of the load beam 235 will be described. A gimbal $238_{-1}$ shown in FIG. 28 has a first beam $244_{-1}$ having a long width A, and an opening $239_{-1}$ having a long length B. First and second beams $241_{-1}$ and $242_{-1}$ are long.

Figure 29:
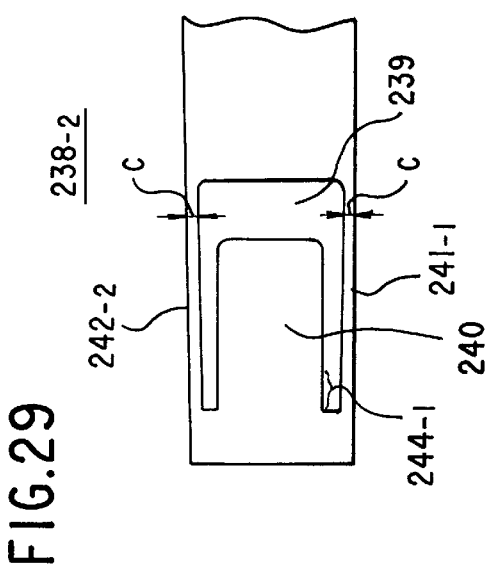
FIG. 29 is a plan view of a second variation of the gimbal of the load beam used in the seventh embodiment of the present invention.

FIG. 29 shows a second variation $238_{-2}$ of the gimbal 238. The gimbal $238_{-2}$ has first and second beams $241_{-2}$ and $242_{-2}$ each having a small width C.

Figure 30:
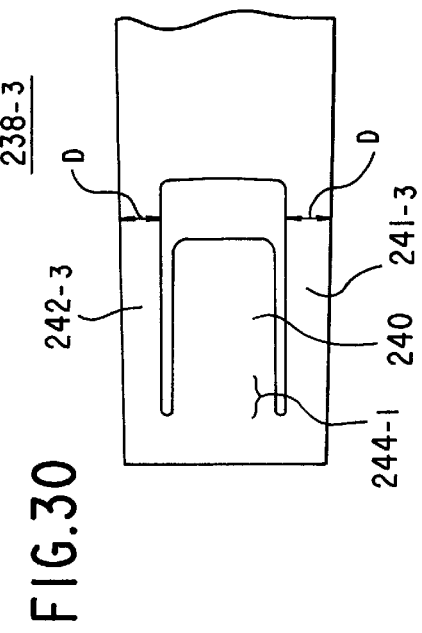
FIG. 30 is a plan view of a third variation of the gimbal of the load beam used in the seventh embodiment of the present invention.

FIG. 30 shows a third variation $238_{-3}$ of the gimbal 238. The gimbal $238_{-3}$ has first and second variations $241_{-3}$ and $242_{-3}$ having a large width D.

Figure 31:
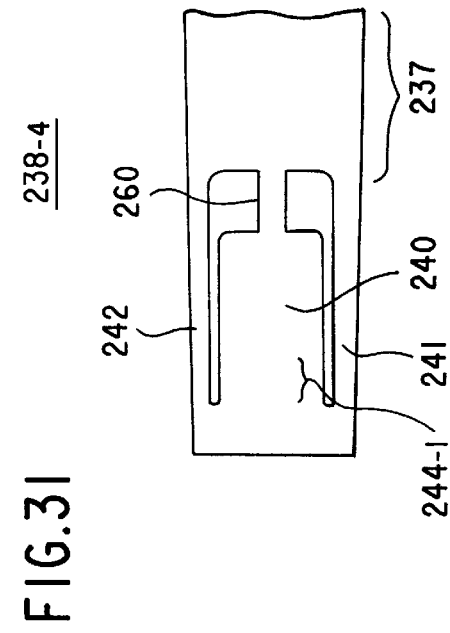
FIG. 31 is a plan view of a fourth variation of the gimbal of the load beam used in the seventh embodiment of the present invention.

FIG. 31 shows a fourth variation $238_{-4}$ of the gimbal 238. The gimbal $238_{-4}$ has a fourth beam 260 connecting the center of the end of the magnetic head slider fixing portion 240 and the load beam main body 237 together. The fourth beam 260 functions to prevent a deformation of the magnetic head slider fixing portion 240, but increases the rotation stiffness. Hence, it is desired that the width of the fourth beam 260 be as small as possible and the length thereof are as long as possible.

Figure 32:
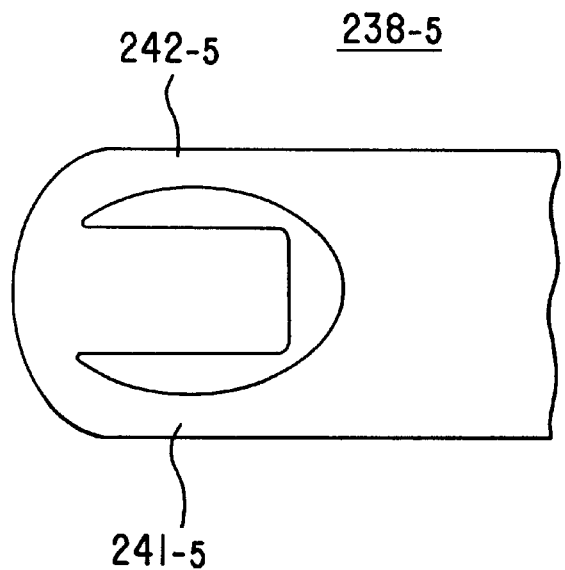
FIG. 32 is a plan view of a fifth variation of the gimbal of the load beam used in the seventh embodiment of the present invention.

FIG. 32 shows a fifth variation $238_{-5}$ of the gimbal 238. The gimbal $238_{-5}$ has first and second arch-shaped beams $241_{-5}$ and $242_{-5}$.

Figure 33:
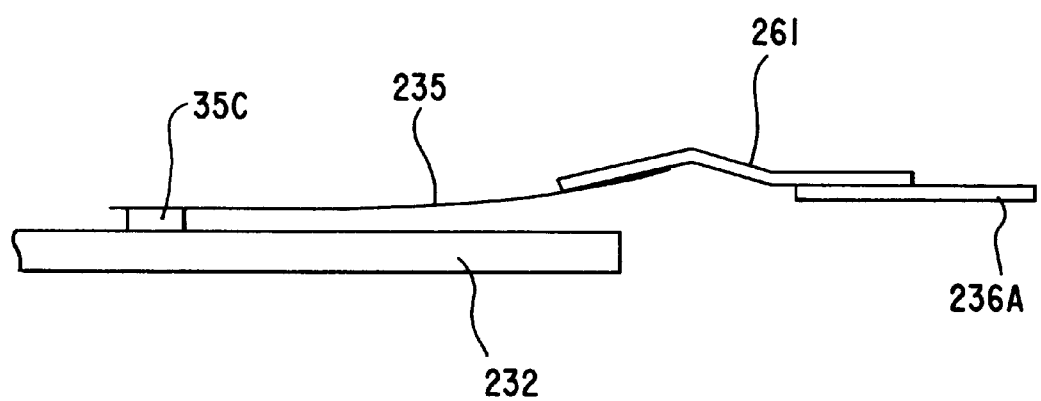
FIG. 33 is a side view of a variation of the seventh embodiment of the present invention.

As shown in FIG. 33, a bent connecting plate 261 is fixed to an arm 236A, and the load beam 235 is fixed to the connecting plate 261. Hence, it is not necessary to subject the arm 236A to bending stresses.

In the variations shown in FIG. 28 through 32, it can be said that the third beam 244 shown in FIG. 21 has the same width as the fixing portion 240 and is integrated with the fixing portion 240.

In the first through sixth embodiments, the load applied to the magnetic head slider is generated by bending the spring portion of the load beam. Alternatively, it is possible to employ the arm fixing structure used in the seventh embodiment of the present invention in which the spring portion is kept flat.

The present invention is not limited to the specifically disclosed embodiments and variations, and other variations and modifications may be made without departing from the scope of the present invention.

What is claimed is:

1. A load beam assembly used in a magnetic disk drive, comprising:
    a head slider having an air bearing surface and a terminal surface, said terminal surface having head terminals for passing a recording/reproducing signal;
    a substantially rectangularly-shaped plate having a gimbal portion at one longitudinal end and an attachment portion at the other longitudinal end, said plate having at least one opening at the gimbal portion, said opening defining at least two beam portions and a slider fixing portion, both of said beam portions and said slider fixing portion integrally formed in a one-piece construction with said plate and defining the gimbal portion;
    said slider fixing portion connected to said plate through said beam portions and having a bonding surface facing said head slider for flexibly supporting said head slider with flexibility of said beam portions;
    conductive wiring patterns formed on said plate, and having a first plurality of terminals on the bonding surface of said slider fixing portion, a second plurality of terminals on the attachment portion and wiring portions connecting the first plurality of terminals and the second plurality of terminals through said beam portions;
    means for bonding said head slider to the bonding surface of said slider fixing portion; and
    means for electrically connecting the head terminals of said head slider and the first plurality of terminals of said slider fixing portion.

2. The load beam assembly as claimed in claim 1, wherein said wiring patterns include a pair of wiring patterns used for generating at least a reproducing signal.

3. The load beam assembly as claimed in claim 1, wherein said wiring patterns include two pairs of wiring patterns, wherein one pair of wiring patterns is used for generating a reproducing signal, the other pair of wiring patterns being used for generating a recording signal.

4. The load beam assembly as claimed in claim 1, wherein said wiring patterns are located substantially symmetrically about a longitudinal center line of said plate except on the attachment portion.

5. The load beam assembly as claimed in claim 1, wherein the conductive wiring patterns are thin-film patterns.

6. The load beam assembly as claimed in claim 1, further comprising a magnetic head mounted on said head slider said head comprising an MR head transducer.

7. The load beam assembly as claimed in claim 1, further comprising a dummy pattern provided to a portion of the conductive wiring patterns, said portion being asymmetrical about a longitudinal center line of said plate.

8. The load beam assembly as claimed in claim 1, wherein said at least two beam portions and said slider fixing portion are flush with each other.

9. The load beam assembly as claimed in claim 1, wherein said head slider is placed on a dummy pattern provided to ensure pattern symmetry.

10. A load beam assembly used in a magnetic disk drive, comprising:

a head slider having an air bearing surface and a terminal surface, said terminal surface having head terminals for passing a recording/reproducing signal;

a substantially rectangular-shaped metal plate having a gimbal portion at one longitudinal end and an attachment portion at the other longitudinal end, said plate having at least one opening at the gimbal portion, said opening defining at least two beam portions and a slider fixing portion, both of said beam portions and said slider fixing portion integrally formed in a one-piece construction with said plate and defining the gimbal portion;

said slider fixing portion connected to said plate through said beam portions and having a bonding surface facing said head slider for flexibly supporting said head slider with flexibility of said beam portions;

an insulating layer formed on said metal plate; and conductive wiring patterns formed on said insulating layer and having a first plurality of terminals on the bonding surface of said slider fixing portion, a second plurality of terminals on the attachment portion and wiring portions connecting the first plurality of terminals and the second plurality of terminals through said beam portions;

means for bonding said head slider to the bonding surface of said slider fixing portion; and means for electrically connecting the head terminals of said head slider and the first plurality of terminals of said slider fixing portion.

11. The load beam assembly as claimed in claim 10, wherein said metal plate has a thickness of substantially 25 $\mu$m.

12. The load beam assembly as claimed in claim 10, wherein said metal plate and the opening thereof are simultaneously formed by a press process.

13. The load beam assembly as claimed in claim 10, wherein said metal plate has a bending portion and a pair of rib portions, said bending portion being formed between said gimbal portion and said attachment portion, said rib portions being symmetrically formed on both longitudinal sides of said plate and extending from said bending portion to said slider fixing portion.

14. The load beam assembly as claimed in claim 10, wherein said first terminals are formed of said slider fixing portion, and said second terminals are formed on said attachment portion.

15. The load beam assembly as claimed in claim 10, wherein said wiring patterns are substantially symmetrically formed about a longitudinal center line of said plate except on the attachment portion.

16. The load beam assembly as claimed in claim 10, further comprising a protection layer as formed on said wiring patterns except for the first and second terminals.

17. The load beam assembly as claimed in claim 10, wherein at least an exposed portion of said wiring patterns is made of Au.

18. The load beam assembly as claimed in claim 10, further comprising a dummy pattern provided to a portion of the conductive wiring patterns, said portion being asymmetrical about a longitudinal center line of said plate.

19. The load beam assembly as claimed in claim 10, wherein said conductive wiring patterns comprise an insulating film formed on said plate, and conductive films formed on said insulating film.

20. The load beam assembly as claimed in claim 19, wherein said insulating film is approximately 5 $\mu$m thick.

21. The load beam assembly as claimed in claim 10, wherein said conductive wiring patterns comprise an insulating film formed on said plate, conductive films formed on said insulating film, and a projection film which covers the conductive films.

22. The load beam assembly as claimed in claim 21, wherein said insulating film and said protection film are made of a photosensitive polyimide.

23. The load beam assembly as claimed in claim 10, further comprising a magnetic head mounted on said head slider, said head comprising an MR head transducer.

24. The load beam assembly as claimed in claim 10, wherein said at least two beam portions and said slider fixing portion are flush with each other.

25. The load beam assembly as claimed in claim 10, wherein said head slider is placed on a dummy pattern provided to ensure pattern symmetry.

26. A load beam used in a magnetic disk drive, comprising:

a substantially rectangularly shaped plate having a gimbal portion at one longitudinal end and an attachment portion at the other longitudinal end, said plate having at least one opening at the gimbal portion, said opening defining a pair of beam portions and a slider fixing portion, both of said beam portions and said slider fixing portion integrally formed in a one-piece construction with said plate and defining the gimbal portion;

said beam portions being formed substantially symmetrically about a longitudinal center line of said plate;

said slider fixing portion connected to said plate through said beam portions and flexibly supported by said beam portions;

wiring patterns being formed on said plate and having a first plurality of terminals on said slider fixing portion, a second plurality of terminals on the attachment portion, said wiring patterns connecting the first plurality of terminals and the second plurality of terminals through said beam portions; and wherein half of said wiring patterns pass through one of said beam portions and the remaining of said wiring patterns pass through the other of said beam portions whereby said wiring patterns on the gimbal portions are substantially symmetrical about the longitudinal center line of said plate.

27. A load beam used in a magnetic disk drive comprising:

a substantially rectangularly shaped plate having a gimbal portion at one longitudinal end and an attachment portion at the other longitudinal end, said plate having at least one opening at the gimbal portion, said opening defining a pair of beam portions and a slider fixing portion, both of said beam portions and said slider fixing portion integrally formed in a one-piece construction with said plate and defining the gimbal portion;

said slider fixing portion connected to said plate through said beam portions and flexibly supported by said beam portions;

wiring patterns being formed on said plate and having a first plurality of terminals formed on said slider fixing portion, a second plurality of terminals on the attachment portion, said wiring patterns connecting the first plurality of terminals and the second plurality of terminals through said beam portions; and a dummy pattern formed on said slider fixing portion and separated from the first plurality of terminals on said slider fixing portion.

28. A load beam used in a magnetic disk drive comprising:

a substantially rectangularly-shaped metal plate having a gimbal portion at one longitudinal end and an attachment portion at the other longitudinal end, said plate having at least one opening at the gimbal portion, said opening defining at least a pair of beam portions and a slider fixing portion, both of said beam portions and said slider fixing portion integrally formed in a one-piece construction with said plate and defining the gimbal portion;

said slider fixing portion connected to said plate through said beam portions and flexibly supported by said beam portions;

an insulating layer formed on said metal plate;

four wiring patterns formed on said plate and having a first plurality of terminals on said slider fixing portion, a second plurality of terminals on said attachment portion, said wiring patterns connecting the first plurality of terminals and the second plurality of terminals through said beam portions; and a protective layer formed on said wiring patterns except on the first plurality of terminals and the second plurality of terminals.

29. The load beam as claimed in claim 28, wherein half of said wiring patterns pass through one of said beam portions and the remaining of said wiring patterns pass through the other of said beam portions.

30. The load beam as claimed in claim 28, wherein said wiring patterns are formed substantially symmetrically about a longitudinal center line of said plate except on the attachment portion.

31. The load beam as claimed in claim 28, wherein said wiring patterns are provided on one of said pair of beam portions, and a dummy pattern is provided on the other one of said pair of beam portions.

32. The load head as claimed in claim 28, further comprising a magnetic head mounted on said head slider, said head comprising an MR head transducer.

33. The load beam as claimed in claim 28, wherein said at least one pair of beam portions and said slider fixing portion are flush with each other.

34. The load beam as claimed in claim 28, wherein said head slider is placed on a dummy pattern provided to ensure pattern symmetry.

35. A load beam used in a magnetic disk drive, comprising:

a substantially rectangularly-shaped metal plate having a gimbal portion at one longitudinal end and an attachment portion at the other longitudinal end, said plate having a substantially U-shaped opening, said opening defining at least one pair of beam portions and a slider fixing portion, both of said beam portions and said slider fixing portion integrally formed in a one-piece construction with said plate and defining the gimbal portion, said beam portions being formed substantially symmetrically about a longitudinal center line of said plate;

said slider fixing portion connected to said plate through said beam portions and flexibly supported by said beam portions;

an insulating layer formed on said metal plate;

four wiring patterns formed on said plate and having a first plurality of terminals on said slider fixing portion, a second plurality of terminals on said attachment portion, said wiring patterns connecting the first plurality of terminals and the second plurality of terminals through said beam portions; and a protective layer formed on said wiring patterns except on the first plurality of terminals and second plurality of terminals.

36. The load beam as claimed in claim 35, wherein half of said wiring patterns pass through one of said beam portions and the remaining of said wiring patterns pass through the other of said beam portions.

37. The load beam as claimed in claim 35, wherein said wiring patterns are formed substantially symmetrically about a longitudinal center line of said plate except on the attachment portion.

38. The load beam as claimed in claim 35, wherein said conductive wiring patterns are provided on one of said at least one pair of beam portions, and a dummy pattern is provided on the other one of said at least one pair of beam portions.

39. The load beam as claimed in claim 35, further comprising a magnetic head mounted on said head slider said head comprising an MR head transducer.

40. The load beam as claimed in claim 35, wherein said at least one pair of beam portions and said slider fixing portion are flush with each other.

41. The load beam as claimed in claim 35, wherein said head slider is placed on a dummy pattern provided to ensure pattern symmetry.

42. A magnetic disk drive comprising:

a load beam;

a head slider having a recording/reproducing element and a first plurality of terminals for passing a recording/reproducing signal;

a head actuator connected to said load arm for moving and positioning said head slider on a recording medium;

a substantially rectangularly shaped plate having a gimbal portion at one longitudinal end and an attachment portion of the other longitudinal end, said plate having at least one opening at the gimbal portion, said opening defining at least two beam portions and a slider fixing portion, both of said beam portions and said slider fixing portion integrally formed in a one-piece construction with said plate and defining the gimbal portion said slider fixing portion connected to said plate through said beam portions and having a bonding surface facing said head slider for flexibly supporting said head slider with flexibility of said beam portions;

conductive wiring patterns being formed on said plate and including a second plurality of terminals; and means for electrically connecting said first plurality of terminals and said second plurality of terminals, respectively through said beam portions.

43. A magnetic disk drive comprising:

a load beam;

a head slider having a recording element, a reproducing element, a first plurality of terminals for inputting a recording signal and a second plurality of terminals for outputting a reproducing signal;

a head actuator connected to said load arm for moving and positioning said head slider on a recording medium;

a substantially rectangularly-shaped plate having a gimbal portion at one longitudinal end and an attachment portion at the other longitudinal end, said plate having at least one opening at the gimbal portion, said opening defining at least two beam portions and a slider fixing portion, both of said beam portions and said slider fixing portion integrally formed in a one-piece construction with said plate and defining the gimbal portion, said slider fixing portion connected to said plate through said beam portions and having a bonding surface facing said head slider for flexibly supporting said head slider, with flexibility of said beam portions;

four conductive wiring patterns being formed on said plate and including a third plurality of terminals for the recording signal and a fourth plurality of terminals for the reproducing signal;

means for electrically connecting said first plurality of terminals and said third plurality of terminals through said beam portions; and means for electrically connecting said second plurality of terminals and said fourth plurality of terminals through said beam portions.

44. A load beam used in a magnetic disk drive, comprising:

a substantially rectangularly-shaped plate having a gimbal portion at one end and an attachment portion at the other end, said plate having at least one through-hole between the gimbal portion and the attachment portion on a longitudinal center line of said plate; and wiring patterns formed entirely on said plate by plating and having a first plurality of terminals on the gimbal portion, a second plurality of terminals on the attachment portion, said wiring patterns connecting the first plurality of terminals and the second plurality of terminals, wherein the wiring portions bypass the through-hole on one side of said through-hole, and wherein said plate has at least one opening at the gimbal portion, said opening defining at least one pair of beam portions and said slider fixing portion, both of said beam portions and said slider fixing portion integrally formed in a one-piece construction with said plate and defining the gimbal portion.

45. The load beam as claimed in claim 44, wherein the conductive wiring patterns are thin-film patterns.

46. A load beam used in a magnetic disk drive comprising:

a substantially rectangular-shaped metal plate having a gimbal portion at one end and an attachment portion at the other end, said plate having at least one through-hole between the gimbal portion and the attachment portion on a longitudinal center line of said plate;

wiring patterns formed on said plate and having a first plurality of terminals on the gimbal portion, a second plurality of terminals on the attachment portion and wiring portions connecting the first plurality of terminals and the second plurality of terminals, wherein half of the wiring patterns bypass the through-hole on one side of said through-hole and the remaining of said wiring patterns bypass the through-hole through the other side of the through-hole, and wherein said plate has at least one opening at the gimbal portion, said opening defining at least one pair of beam portions and a slider fixing portion, both of said beam portions and said slider fixing portion integrally formed in a one-piece construction with said plate and gimbal portion.

47. A load beam assembly used in a magnetic disk drive, comprising:

a head slider having an air bearing surface and a terminal surface, said terminal surface having a first plurality of terminals for passing a recording/reproducing signal;

a substantially rectangularly-shaped plate having a gimbal portion at one longitudinal end and an attachment portion at the other longitudinal end, said plate having at least one opening at the gimbal portion, said opening defining at least two beam portions and a slider fixing portion, both of said beam portions and said slider fixing portion integrally formed in a one-piece construction with said plate and defining the gimbal portion;

said slider fixing portion connected to said plate through said beam portions and having a bonding surface facing said head slider for flexibly supporting said head slider with flexibility of said beam portions;

conductive wiring patterns formed on said plate and having a first plurality of terminals on the bonding surface of said slider fixing portion and a second plurality of terminals on the attachment portion, said wiring patterns connecting the first plurality of terminals and the second plurality of terminals through said beam portions;

means for bonding said head slider to the bonding surface of said slider fixing portions; and balls provided between the terminal surface of said head slider and the bonding surface of said slider fixing portion and electrically connecting the head terminals of said head slider and the first plurality of terminals of said slider fixing portion.

48. The load beam assembly as claimed in claim 47, wherein said conductive balls are made of Au.

49. The load beam assembly as claimed in claim 47, wherein at least exposed portions of said first and/or second terminals are made of Au.

50. A load beam assembly used in a magnetic disk drive, comprising:

a head slider having an air bearing surface and a terminal surface having a first plurality of terminals, said first plurality of terminals including two input terminals for inputting a recording signal and two output terminals for outputting a reproducing signal;

a substantially rectangularly-shaped plate having a gimbal portion at one longitudinal end and an attachment portion at the other longitudinal end, said plate having at least one opening at the gimbal portion, said opening defining at least two beam portions and a slider fixing portion, both of said beam portions and said slider fixing portion integrally formed in a one-piece construction with said plate and defining the gimbal portion;

said slider fixing portion connected to said plate through said beam portions and having a bonding surface facing said head slider for flexibly supporting a head slider with flexibility of said beam portions;

four conductive wiring patterns formed on said plate, said wiring patterns having a second plurality of terminals formed on the bonding surface of said slider fixing portion; and balls provided between the terminal surface of said head slider and the bonding surface of said slider fixing portion and electrically connecting the head terminals of said head slider and the first plurality of terminals of said slider fixing portion.

51. A load beam assembly used in a magnetic disk driver, said load beam comprising:

a substantially rectangular-shaped plate having at least one opening, said openings defining at least two beam portions and a slider fixing portion;

said beam portions including a first beam portion and a second beam portion, said first and second beam portions each being formed substantially symmetrically about a longitudinal center line of said plate;

said slider fixing portion, connected to said plate through said beam portions and flexibly supported by said beam portions, for flexibly supporting a head slider used in the magnetic disk drive;

wiring patterns formed on said first beam portion; and dummy patterns formed on said second beam portion in at a position which ensures symmetry between said wiring patterns and said dummy patterns;

said load beam being integral with a gimbal spring formed by one-piece construction with the load beam, said load beam loading a magnetic head to a magnetic disk medium by an elasticity force of the load beam, and said gimbal spring including the two beam portions.

52. The load beam assembly as claimed in claim 51, wherein said head slider is placed on said dummy patterns.

* * * * *